United States Patent [19]

Maul

[11] 4,232,861
[45] Nov. 11, 1980

[54] SORTING METHOD AND MACHINE

[75] Inventor: Michael Maul, Schwabach near Nurnberg, Fed. Rep. of Germany

[73] Assignee: Maul Lochkartengerate GmbH, Schwabach, Fed. Rep. of Germany

[21] Appl. No.: 859,212

[22] Filed: Dec. 9, 1977

[30] Foreign Application Priority Data

Dec. 22, 1976 [DE] Fed. Rep. of Germany ....... 2658171

[51] Int. Cl.² ........................................... B65H 39/10
[52] U.S. Cl. .................................. 271/287; 271/288; 271/297
[58] Field of Search ............... 209/509, 569, 583, 584, 209/554; 271/64, 173, 287, 288, 297, 298

[56] References Cited

U.S. PATENT DOCUMENTS

| | | | |
|---|---|---|---|
| 2,993,595 | 7/1961 | Dickinson et al. | 209/583 X |
| 3,774,906 | 11/1973 | Fagan et al. | 271/197 |
| 3,802,694 | 4/1974 | Post et al. | 271/173 |
| 4,046,259 | 9/1977 | Dunlap | 271/64 X |

OTHER PUBLICATIONS

Rodgers, J. C.; "Collator Interrupt"; 9/1975; vol. 18 No. 4.

Primary Examiner—Joseph J. Rolla
Attorney, Agent, or Firm—Michael J. Striker

[57] ABSTRACT

A sorting machine receives M successive groups of copies, each group consisting of N identical copies, to be converted into N complete sets of copies. N may considerably exceed the number of collecting bins of the sorting machine. In a first sorting operation, the cards are distributively sorted into a predetermined number of the collecting bins, until all cards have been deposited into bins. The stacks in the bins are then removed and laid one atop the other to form a new infeed stack, which is deposited into the infeed bin of the machine, and a second sorting operation is performed, until all cards have again been deposited into bins. This is repeated, if and as necessary, until the desired conversion has been accomplished. The sequence in which the cards are distributed into bins during especially the second and any subsequent sorting operations is so controlled that the desired sets are actually formed, no matter what the values of M and N and no matter what the number of collecting bins available.

6 Claims, 39 Drawing Figures

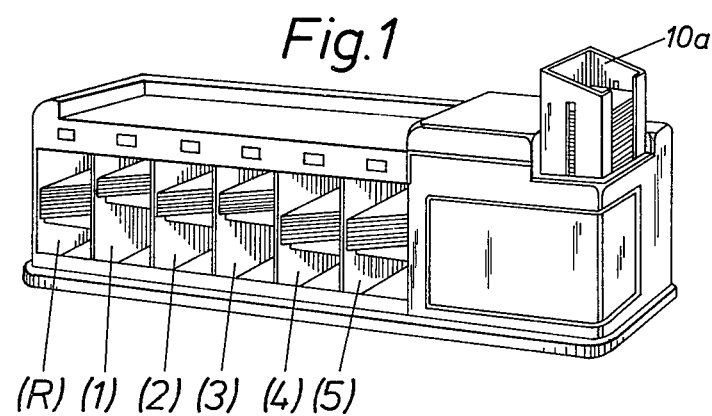
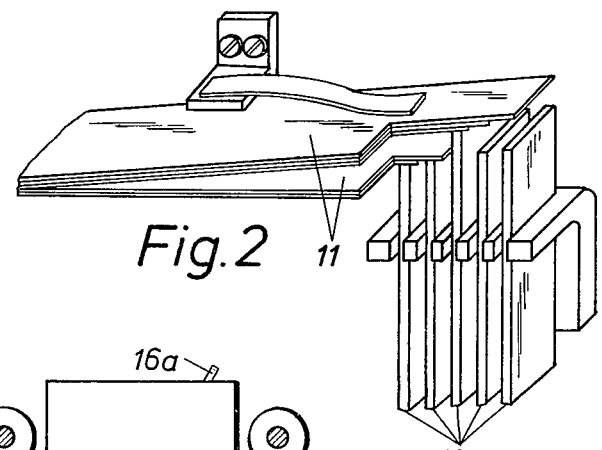
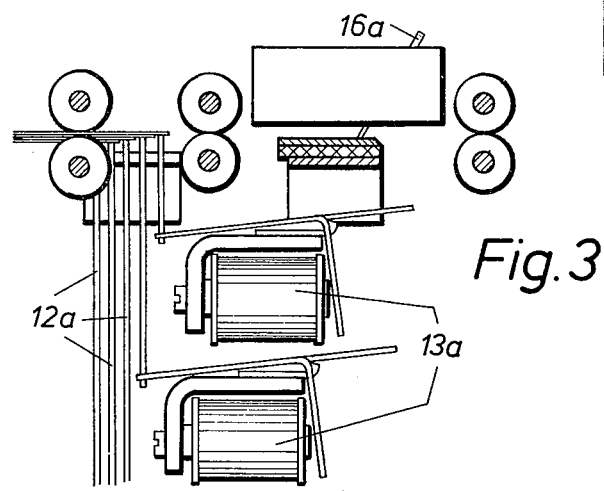

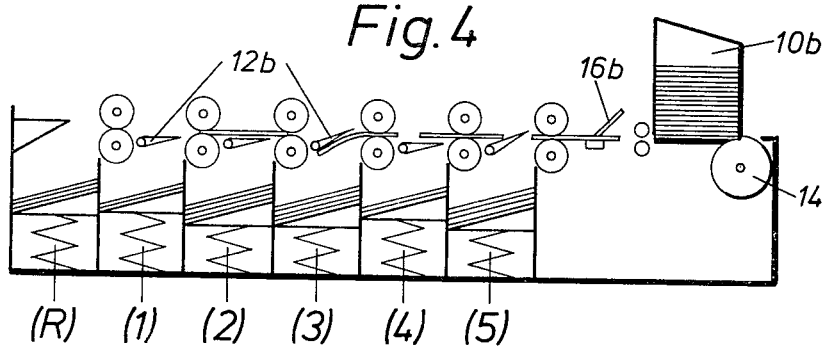
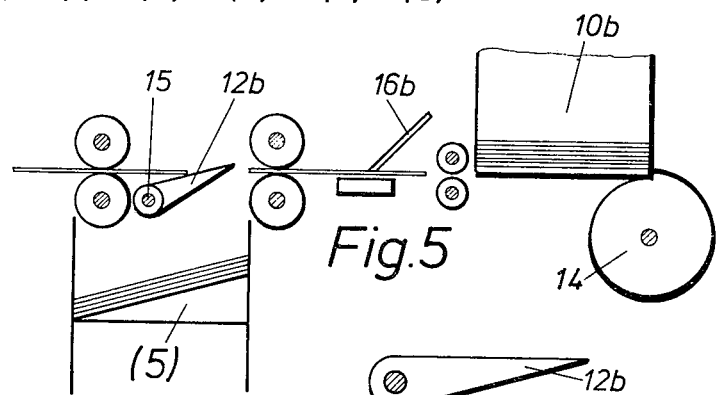
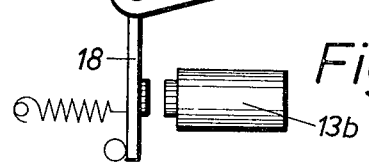
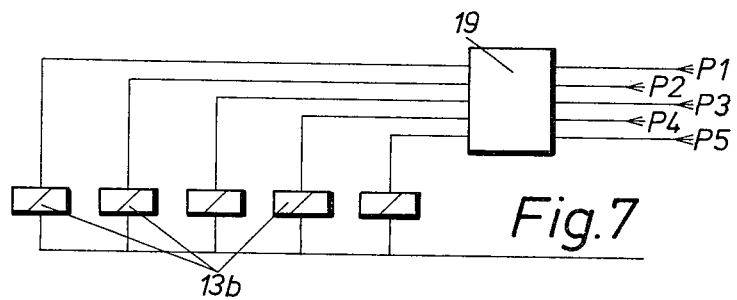

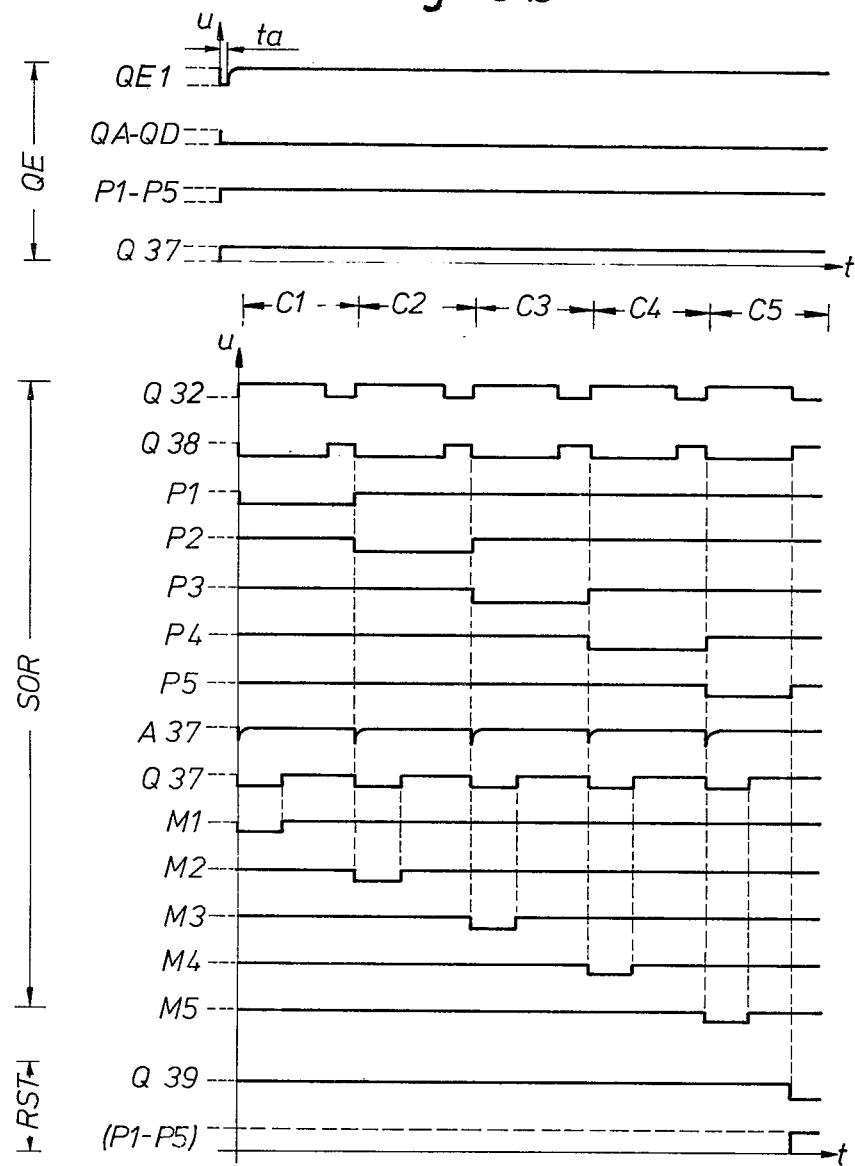

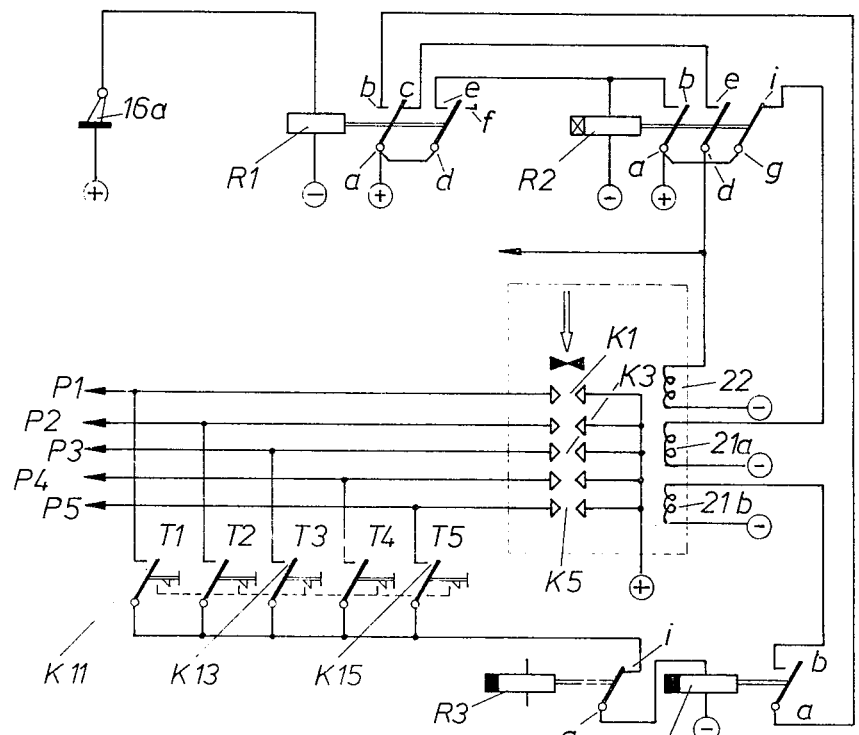

CP = 2 → 5

| I | CP | 2 | 3 | 4 | 5 |
|---|---|---|---|---|---|
|   | PR/VSB = | 2 | 3 | 4 | 5 |

CP = 6 → 25

| I | CP | >5 |
|---|---|---|
|   | PR/VSB = | CP |

| II | CP | 6-10 | 11-15 | 16-20 | 21-25 |
|---|---|---|---|---|---|
|   | PR/VSB = | 2 | 3 | 4 | 5 |
|   | PR'/VSA=BxVSBx | CP - 5 | CP - 10 | CP - 15 | CP - 20 |

| I | CP | >25 |
|---|---|---|
| | PR/VSB= | CP |

| | CP | 26-30 | 31-35 | 36-40 | 41-45 | 46-50 |
|---|---|---|---|---|---|---|
| II | PR/VSB= | 6 | 7 | 8 | 9 | 10 |
| | PR'/VSA =BxVSBx | (CP-25) | (CP-30) | (CP-35) | (CP-40) | (CP-45) |

| | CP | 51-55 | 56-60 | 61-65 | 66-70 | 71-75 |
|---|---|---|---|---|---|---|
| II | PR/VSB= | 11 | 12 | 13 | 14 | 15 |
| | PR'/VSA=BxVSBx | (CP-50) | (CP-55) | (CP-60) | (CP-65) | (CP-70) |

| | CP | 76-80 | 81-85 | 86-90 | 91-95 | 96-100 |
|---|---|---|---|---|---|---|
| II | PR/VSB= | 16 | 17 | 18 | 19 | 20 |
| | PR'/VSA=BxVSBx | (CP-75) | (CP-80) | (CP-85) | (CP-90) | (CP-95) |

| | CP | 101-105 | 106-110 | 111-115 | 116-120 | 121-125 |
|---|---|---|---|---|---|---|
| II | PR/VSB= | 21 | 22 | 23 | 24 | 25 |
| | PR'/VSA= BxVSBx | (CP-100) | (CP-105) | (CP-110) | (CP-115) | (CP-120) |

| | CP | | 26-50 | 51-75 | 76-100 | 101-125 |
|---|---|---|---|---|---|---|
| III | PR/VSB | | 2 | 3 | 4 | 5 |
| | PR'/VSA=BxVSBx | | (CP-25) | (CP-50) | (CP-75) | (CP-100) |

Fig. 16/0

| SP05 | A05 | B05 | ⟶ | Y05 | Z05 |
| SP04 | A04 | B04 | ⟶ | Y04 | Z04 |
| SP03 | A03 | B03 | ⟶ | Y03 | Z03 |
| SP02 | A02 | B02 | ⟶ | Y02 | Z02 |
| SP01 | A01 | B01 | ⟶ | Y01 | Z01 |

Fig. 16/I

| (1) | (2) | (3) | (4) | (5) |
|---|---|---|---|---|
| Z01 Y01 X01 | Z02 Y02 X02 | Z03 Y03 X03 | Z04 Y04 X04 | Z05 Y05 X05 |
| ↑ | ↑ | ↑ | ↑ | ↑ |
| F01 E01 D01 C01 B01 A01 SP01 | F02 E02 D02 C02 B02 A02 SP02 | F03 E03 D03 C03 B03 A03 SP03 | F04 E04 D04 C04 B04 A04 SP04 | F05 E05 D05 C05 B05 A05 SP05 |

Fig. 17/0

| SP25 | A25 | B25 | C25 |
| SP24 | A24 | B24 | C24 |
| SP23 | A23 | B23 | C23 |
| ↑ | ↑ | ↑ | ↑ |
| SP03 | A03 | B03 | C03 |
| SP02 | A02 | B02 | C02 |
| SP01 | A01 | B01 | C01 |

Fig. 17/I

| (1) | (2) | (3) | (4) | (5) |
|---|---|---|---|---|
| C21 | C22 | C23 | C24 | C25 |
| C16 | C17 | C18 | C19 | C20 |
| C11 | C12 | C13 | C14 | C15 |
| C06 | C07 | C08 | C09 | C10 |
| C01 | C02 | C03 | C04 | C05 |
| B21 | B22 | B23 | B24 | B25 |
| B16 | B17 | B18 | B19 | B20 |
| B11 | B12 | B13 | B14 | B15 |
| B06 | B07 | B08 | B09 | B10 |
| B01 | B02 | B03 | B04 | B05 |
| A21 | A22 | A23 | A24 | A25 |
| A16 | A17 | A18 | A19 | A20 |
| A11 | A12 | A13 | A14 | A15 |
| A06 | A07 | A08 | A09 | A10 |
| A01 | A02 | A03 | A04 | A05 |
| SP21 | SP22 | SP23 | SP24 | SP25 |
| SP16 | SP17 | SP18 | SP19 | SP20 |
| SP11 | SP12 | SP13 | SP14 | SP15 |
| SP06 | SP07 | SP08 | SP09 | SP10 |
| SP01 | SP02 | SP03 | SP04 | SP05 |

Fig. 17/a

| II/(5)-I |
|---|
| II/(4)-I |
| II/(3)-I |
| II/(2)-I |
| II/(1)-I |

Fig. 17/II

| C05 B05 A05 SP05 | C10 B10 A10 SP10 | C15 B15 A15 SP15 | C20 B20 A20 SP20 | C25 B25 A25 SP25 |
|---|---|---|---|---|
| C04 B04 A04 SP04 | C09 B09 A09 SP09 | C14 B14 A14 SP14 | C19 B19 A19 SP19 | C24 B24 A24 SP24 |
| C03 B03 A03 SP03 | C08 B08 A08 SP08 | C13 B13 A13 SP13 | C18 B18 A18 SP18 | C23 B23 A23 SP23 |
| C02 B02 A02 SP02 | C07 B07 A07 SP07 | C12 B12 A12 SP12 | C17 B17 A17 SP17 | C22 B22 A22 SP22 |
| C01 B01 A01 SP01 | C06 B06 A06 SP06 | C11 B11 A11 SP11 | C16 B16 A16 SP16 | C21 B21 A21 SP21 |
| (1) | (2) | (3) | (4) | (5) |

Fig. 18/0

| SP125 | A125 | B125 | C125 |
| SP124 | A124 | B124 | C124 |
| SP123 | A123 | B123 | C123 |
| ↑ | ↑ | ↑ | ↑ |
| SP003 | A003 | B003 | C003 |
| SP002 | A002 | B002 | C002 |
| SP001 | A001 | B001 | C001 |

Fig. 18/I

| C121 | C122 | C123 | C124 | C125 |
| C116 | C117 | C118 | C119 | C120 |
| ↑ | ↑ | ↑ | ↑ | ↑ |
| C006 | C007 | C008 | C009 | C010 |
| C001 | C002 | C003 | C004 | C005 |
| B121 | B122 | B123 | B124 | B125 |
| B116 | B117 | B118 | B119 | B120 |
| ↑ | ↑ | ↑ | ↑ | ↑ |
| B006 | B007 | B008 | B009 | B010 |
| B001 | B002 | B003 | B004 | B005 |
| A121 | A122 | A123 | A124 | A125 |
| A116 | A117 | A118 | A119 | A120 |
| ↑ | ↑ | ↑ | ↑ | ↑ |
| A006 | A007 | A008 | A009 | A010 |
| A001 | A002 | A003 | A004 | A005 |
| SP121 | SP122 | SP123 | SP124 | SP125 |
| SP116 | SP117 | SP118 | SP119 | SP120 |
| ↑ | ↑ | ↑ | ↑ | ↑ |
| SP006 | SP007 | SP008 | SP009 | SP010 |
| SP001 | SP002 | SP003 | SP004 | SP005 |
| (1) | (2) | (3) | (4) | (5) |

Fig. 18/a

| II/(5)-I |
|---|
| II/(4)-I |
| II/(3)-I |
| II/(2)-I |
| II/(1)-I |

Fig. 18/IIa

| C102 ↑ C002 | C107 ↑ C007 | C112 ↑ C012 | C117 ↑ C017 | C122 ↑ C022 |
| B102 ↑ B002 | B107 ↑ B007 | B112 ↑ B012 | B117 ↑ B017 | B122 ↑ B022 |
| A102 ↑ A002 | A107 ↑ A007 | A112 ↑ A012 | A117 ↑ A017 | A122 ↑ A022 |
| SP102 ↑ SP002 | SP107 ↑ SP007 | SP112 ↑ SP012 | SP117 ↑ SP017 | SP122 ↑ SP022 |

| C101 ↑ C001 | C106 ↑ C006 | C111 ↑ C011 | C116 ↑ C016 | C121 ↑ C021 |
| B101 ↑ B001 | B106 ↑ B006 | B111 ↑ B011 | B116 ↑ B016 | B121 ↑ B021 |
| A101 ↑ A001 | A106 ↑ A006 | A111 ↑ A011 | A116 ↑ A016 | A121 ↑ A021 |
| SP101 SP076 SP051 SP026 SP001 | SP106 SP081 SP056 SP031 SP006 | SP111 SP086 SP061 SP036 SP011 | SP116 SP091 SP066 SP041 SP016 | SP121 SP096 SP071 SP046 SP021 |
| (1) | (2) | (3) | (4) | (5) |

Fig. 18/IIb

| (1) | (2) | (3) | (4) | (5) |
|---|---|---|---|---|
| C105 ↑ C005 B105 ↑ B005 A105 ↑ A005 SP105 ↑ SP005 | C110 ↑ C010 B110 ↑ B010 A110 ↑ A010 SP110 ↑ SP010 | C115 ↑ C015 B115 ↑ B015 A115 ↑ A015 SP115 ↑ SP015 | C120 ↑ C020 B120 ↑ B020 A120 ↑ A020 SP120 ↑ SP020 | C125 ↑ C025 B125 ↑ B025 A125 ↑ A025 SP125 ↑ SP025 |
| C104 ↑ C004 B104 ↑ B004 A104 ↑ A004 SP104 ↑ SP004 | C109 ↑ C009 B109 ↑ B009 A109 ↑ A009 SP109 ↑ SP009 | C114 ↑ C014 B114 ↑ B014 A114 ↑ A014 SP114 ↑ SP014 | C119 ↑ C019 B119 ↑ B019 A119 ↑ A019 SP119 ↑ SP019 | C124 ↑ C024 B124 ↑ B024 A124 ↑ A024 SP124 ↑ SP024 |
| C103 ↑ C003 B103 ↑ B003 A103 ↑ A003 SP103 ↑ SP003 | C108 ↑ C008 B108 ↑ B008 A108 ↑ A008 SP108 ↑ SP008 | C113 ↑ C013 B113 ↑ B013 A113 ↑ A013 SP113 ↑ SP013 | C118 ↑ C018 B118 ↑ B018 A118 ↑ A018 SP118 ↑ SP018 | C123 ↑ C023 B123 ↑ B023 A123 ↑ A023 SP123 ↑ SP023 |

Fig. 18/b

| III/(5)-II |
|---|
| III/(4)-II |
| III/(3)-II |
| III/(2)-II |
| III/(1)-II |

Fig. 18/III

| C025 | C050 | C075 | C100 | C125 |
|---|---|---|---|---|
| B025 | B050 | B075 | B100 | B125 |
| A025 | A050 | A075 | A100 | A125 |
| SP025 | SP050 | SP075 | SP100 | SP125 |
| III(2)→II SP006 | III(3)→II SP031 | III(4)→II SP056 | III(5)→II SP081 | III(5)→II SP106 |
| C005 | C030 | C055 | C080 | C105 |
| B005 | B030 | B055 | B080 | B105 |
| A005 | A030 | A055 | A080 | A105 |
| SP005 | SP030 | SP055 | SP080 | SP105 |
| C004 | C029 | C054 | C079 | C104 |
| B004 | B029 | B054 | B079 | B104 |
| A004 | A029 | A054 | A079 | A104 |
| SP004 | SP029 | SP054 | SP079 | SP104 |
| C003 | C028 | C053 | C078 | C103 |
| B003 | B028 | B053 | B078 | B103 |
| A003 | A028 | A053 | A078 | A103 |
| SP003 | SP028 | SP053 | SP078 | SP103 |
| C002 | C027 | C052 | C077 | C102 |
| B002 | B027 | B052 | B077 | B102 |
| A002 | A027 | A052 | A077 | A102 |
| SP002 | SP027 | SP052 | SP077 | SP102 |
| C001 | C026 | C051 | C076 | C101 |
| B001 | B026 | B051 | B076 | B101 |
| A001 | A026 | A051 | A076 | A101 |
| SP001 | SP026 | SP051 | SP076 | SP101 |
| (1) | (2) | (3) | (4) | (5) |

Fig. 20/Ia

| (1) | (2) | (3) | (4) | (5) |
|---|---|---|---|---|
| C11<br>C06<br>C01 | C12<br>C07<br>C02 | C13<br>C08<br>C03 | C09<br>C04 | C10<br>C05 |
| B11<br>B06<br>B01 | B12<br>B07<br>B02 | B13<br>B08<br>B03 | B09<br>B04 | B10<br>B05 |
| A11<br>A06<br>A01 | A12<br>A07<br>A02 | A13<br>A08<br>A03 | A09<br>A04 | A10<br>A05 |
| SP11<br>SP06<br>SP01 | SP12<br>SP07<br>SP02 | SP13<br>SP08<br>SP03 | SP09<br>SP04 | SP10<br>SP05 |

Fig. 20/Ib

| (1) | (2) | (3) | (4) | (5) |
|---|---|---|---|---|
| C11<br>C06<br>C01<br>B11<br>B06<br>B01<br>A11<br>A06<br>A01<br>SP11<br>SP06<br>SP01 | C12<br>C07<br>C02<br>B12<br>B07<br>B02<br>A12<br>A07<br>A02<br>SP12<br>SP07<br>SP02 | C13<br>C08<br>C03<br>B13<br>B08<br>B03<br>A13<br>A08<br>A03<br>SP13<br>SP08<br>SP03 | C09<br>C04<br>B09<br>B04<br>A09<br>A04<br>SP09<br>SP04 | C10<br>C05<br>B10<br>B05<br>A10<br>A05<br>SP10<br>SP05 |

Fig. 20/II

| (1) | (2) | (3) | (4) | (5) |
|---|---|---|---|---|
| C05 | C10 | | | |
| B05 | B10 | | | |
| A05 | A10 | | | |
| SP05 | SP10 | | | |
| C04 | C09 | | | |
| B04 | B09 | | | |
| A04 | A09 | | | |
| SP04 | SP09 | | | |
| C03 | C08 | C13 | | |
| B03 | B08 | B13 | | |
| A03 | A08 | A13 | | |
| SP03 | SP08 | SP13 | | |
| C02 | C07 | C12 | | |
| B02 | B07 | B12 | | |
| A02 | A07 | A12 | | |
| SP02 | SP07 | SP12 | | |
| C01 | C06 | C11 | | |
| B01 | B06 | B11 | | |
| A01 | A06 | A11 | | |
| SP01 | SP06 | SP11 | | |

Fig. 21/I

|  (1)  |  (2)  |  (3)  |  (4)  |  (5)  |
|---|---|---|---|---|
| C 111 | C 112 | C 113 |       |       |
| C 106 | C 107 | C 108 | C 109 | C 110 |
|   ↑   |   ↑   |   ↑   |   ↑   |   ↑   |
| B  01 | B  02 | B  03 | B  04 | B  05 |
| A 111 | A 112 | A 113 |       |       |
| A 106 | A 107 | A 108 | A 109 | A 110 |
|   ↑   |   ↑   |   ↑   |   ↑   |   ↑   |
| A  01 | A  02 | A  03 | A  04 | A  05 |
| SP 111| SP 112| SP 113|       |       |
| SP 106| SP 107| SP 108| SP 109| SP 110|
|   ↑   |   ↑   |   ↑   |   ↑   |   ↑   |
| SP 01 | SP 02 | SP 03 | SP 04 | SP 05 |

Fig. 21/III

|  (1)  |  (2)  |  (3)  |  (4)  |  (5)  |
|---|---|---|---|---|
| C 25  | C 50  | C 75  | C 100 |       |
| B 25  | B 50  | B 75  | B 100 |       |
| A 25  | A 50  | A 75  | A 100 |       |
| SP 25 | SP 50 | SP 75 | SP 100|       |
|   ↑   |   ↑   |   ↑   |   ↑   |       |
| C 14  | C 39  | C 64  | C 89  |       |
| B 14  | B 39  | B 64  | B 89  |       |
| A 14  | A 39  | A 64  | A 89  |       |
| SP 14 | SP 39 | SP 64 | SP 89 | C 113 |
| C 13  | C 38  | C 63  | C 88  | B 113 |
| B 13  | B 38  | B 63  | B 88  | A 113 |
| A 13  | A 38  | A 63  | A 88  | SP 113|
| SP 13 | SP 38 | SP 63 | SP 88 |   ↑   |
|   ↑   |   ↑   |   ↑   |   ↑   |       |
| SP 02 | SP 27 | SP 52 | SP 77 | SP 102|
| C 01  | C 26  | C 51  | C 76  | C 101 |
| B 01  | B 26  | B 51  | B 76  | B 101 |
| A 01  | A 26  | A 51  | A 76  | A 101 |
| SP 01 | SP 26 | SP 51 | SP 76 | SP 101|

Fig. 21/II

| (1) | (2) | (3) | (4) | (5) |
|---|---|---|---|---|
| C 105 | C 110 | | | |
| C 80 | C 85 | C 90 | C 95 | C 100 |
| ↑ | ↑ | ↑ | ↑ | ↑ |
| C 05 | C 10 | C 15 | C 20 | C 25 |
| ↑↑ | ↑↑ | ↑↑ | ↑↑ | ↑↑ |
| ↑ | ↑ | ↑ | | |
| B 04 | B 09 | B 14 | B 19 | B 24 |
| A 104 | A 109 ← | | | |
| A 79 | A 84 | A 89 | A 94 | A 99 |
| ↑ | ↑ | ↑ | ↑ | ↑ |
| A 04 | A 09 | A 14 | A 19 | A 24 |
| SP 104 | SP 109 ← | | | |
| SP 79 | SP 84 | SP 89 | SP 94 | SP 99 |
| ↑ | ↑ | ↑ | ↑ | ↑ |
| SP 04 | SP 09 | SP 14 | SP 19 | SP 24 |
| C 103 | C 108 | C 113 ← | | |
| C 78 | C 83 | C 88 | C 93 | C 98 |
| ↑ | ↑ | ↑ | ↑ | ↑ |
| C 03 | C 08 | C 13 | C 18 | C 23 |
| ↑ | ↑ | ↑ | ↑ | ↑↑ |
| ↑↑ | ↑↑ | ↑↑ | | ↑ |
| A 101 | A 106 | A 111 ← | A 91 | A 96 |
| A 76 | A 81 | A 86 | | |
| ↑ | ↑ | ↑ | ↑ | ↑ |
| A 01 | A 06 | A 11 | A 16 | A 21 |
| SP 101 | SP 106 | SP 111 ← | | |
| SP 76 | SP 81 | SP 86 | SP 91 | SP 96 |
| SP 51 | SP 56 | SP 61 | SP 66 | SP 71 |
| SP 26 | SP 31 | SP 36 | SP 41 | SP 46 |
| SP 01 | SP 05 | SP 11 | SP 16 | SP 21 |

Fig. 22a

| N | 2...F | | F+1...F² | |
|---|---|---|---|---|
|   | Z | $\overline{Z}$ | Z | $\overline{Z}$ |
| I | N | 0 | N | 0 |
| II | — | — | N:F | M·Z·[N−F(Z−1)] |

| N | F²+1...F³ | | F³+1...F⁴ | |
|---|---|---|---|---|
|   | Z | $\overline{Z}$ | Z | $\overline{Z}$ |
| I | N | 0 | N | 0 |
| II | N/F | M·Z·[N−F(Z−1)] | N/F | M·Z·[N−F(Z−1)] |
| III | N/F² | M·Z·[N−F²(Z−1)] | N/F² | M·Z·[N−F²(Z−1)] |
| IV | — | — | N/F³ | M·Z·[N−F³(Z−1)] |

Fig. 22b

SORTING METHOD AND MACHINE

BACKGROUND OF THE INVENTION

In the context of the present invention, one can broadly refer to "sheets", to the extent that it is understood that the term "sheet" is intended to cover a variety of items, including cards, documents, checks, film, and so forth, differing from one another only with respect to material, thickness and size. Because the invention relates to sheets of different types, e.g., cards or even film aperture cards or flat film, the present disclosure will often speak on a general level concerning "sheets", and in terms of "cards" when referring to exemplary embodiments of the invention.

There exist a host of machines of varying types all performing the following operation. Of a plurality (e.g., M) different "masters" or "pictures", N copies of each single one of the M masters are to be produced. The number N is the same for each one of the M masters. Accordingly, one can speak of M groups (each group different) each consisting of N identical copies. These copies are to be so assembled as to form N "sets" of copies, each set consisting of M different copies, with the M different copies of each single set being arranged in the same sequence as the sequence in which the M groups of N identical copies each were received for compilation. The copies can for example be the individual pages of a catalog or book, and one "set" of copies can correspond to the complete catalog or book, or the like.

For the sake of clear understanding, the term "pictures" will sometimes be employed herein to refer to both the "masters" and the copies formed therefrom. Each book, each catalog, each card index, i.e., each "set" accordingly consists of a plurality of different "pictures". This terminology is of course most literally applicable when microfilm aperture cards or microfiches are involved.

Microfilm aperture cards are apertured cards having a viewing cut-out, in which a film image, e.g., from a technical periodical, is located. In certain practical applications, it may happen that each of these "pictures" (i.e., here constituted by microfilm aperture cards) is to be copied N times, and the copies then assembled to form N "sets", with the sets all consisting of the same number of copies, but all the copies within each individual set being different. These sets may, for example, be routed to different departments of a large organization.

Microfiches are flat films, usually of the size of a postcard. Each microfiche (i.e., "picture" using the terminology here employed) contains reduced-scale images of up to a hundred or more pages of text or illustrations, or the like. "Sets" of such microfiches are sent, for example, as catalog-updating supplements to hundreds of customers of a large organization.

To elucidate the basic type of problem to which the invention relates, a simple example will be set forth. Assume that cards of some type are involved. Five copies are to be made from each one of four different pictures A/B/C/D. The stacks of copies are constituted in the following way, with the number system employed starting from the end of each stack, for the sake of correspondence with the detailed description to follow. For the sake of brevity, the term "copy" or "copies" repeatedly used herein is abbreviated to CP.

| CP-Arrangement in 4 Groups A B C D (M = 4) | | | | |
| --- | --- | --- | --- | --- |
| A 5 | B 5 | C 5 | D 5 | |
| A 4 | B 4 | C 4 | D 4 | with 5 identical cards #1, 2, 3, 4, 5 within |
| A 3 | B 3 | C 3 | D 3 | each group (N = 5) |
| A 2 | B 2 | C 2 | D 2 | |
| A 1 | B 1 | C 1 | D 1 | |

Thus, there are a total of 4 stacks, each consisting of five identical cards (20 cards in all). These are to be rearranged to form five sets (N=5) each consisting of four (M=4) different cards A, B, C, D. Thus, the following arrangement must be produced (to avoid confusion between the numbers utilized to identify copy number, and the numbers utilized to identify collating stations or bins, the latter numbers always appear in parentheses):

| | | 5 sets (N = 5) in 5 stations | | | |
| --- | --- | --- | --- | --- | --- |
| (1) | (2) | (3) | (4) | (5) | |
| D 1 | D 2 | D 3 | D 4 | D 5 | each of the five sets including one card |
| C 1 | C 2 | C 3 | C 4 | C 5 | from each of the 4 different groups |
| B 1 | B 2 | B 3 | B 4 | B 5 | (M = 4) |
| A 1 | A 2 | A 3 | A 4 | A 5 | |

The conversion from the CP-arrangement of groups to the arrangement in sets, can be performed in one of the two following ways:

(a) The formation of one set from the individual letter stacks (the A, B, C, D stacks) of the CP arrangement of groups is performed in such a way that one removes the lowest cards A, B, C, D from the four CP-stacks one after the other and lays them in succession one atop the other such that A is located at the bottom of the thusly formed set and D at the top. In this way, the first complete set is formed. The same is done for the next-higher line "2" of the CP-arrangement tabulated above, and so forth, until all five sets have been formed. Thus, this manner of forming the sets involves removal of cards from the different stacks and "compiling" of the assembled cards to form an individual set, set by set. Machines which operate on this basis are typically referred to as "compiling machines" or "collators". (b) However, the same end result can be achieved by "distributing" the copies, or better said by "distributive sorting" of the copies, i.e., the cards of each CP-stack are distributed onto collecting stations or bins. Referring to the "CP-Arrangement" table above, one takes first the vertical A-stack and "sorts" the A-cards into 5 successively located stations of the set-forming set-up. The same is then done for the B-cards, for the C-cards, and for the D-cards, in turn, so that when finished the cards taken from the D-stack occupy the uppermost positions on the five thusly formed stacks, as indicated in the "5 sets" tabulation above. Machines which form the sets in question in this manner are typically designated "sorters", both in the English language and in German.

When, as in the illustrative example just given, only a few different "pictures" and only a few CP-stacks of pictures are involved, both set-forming procedures outlined above can be readily performed by hand or using fairly simple machines. If, for example, price lists, circulars, etc., are to be assembled into a limited number of sets, the "compiling" can be performed using a row of 10 supply bins or stacks, using a gripper which travels along the row of 10 bins and pulls from each one one copy, and then deposits the 10 copies onto a stacking table, to constitute one "set". With the next traverse of the gripper along the row of supply bins, the next complete set is formed and deposited, and so forth. If one is not using a "compiling" technique but instead a "distributive sorting" technique, then use is made of 10 collecting stations. First one CP-stack has its 10 copies distributed into the 10 stations; then this is done for the next CP-stack; and so forth.

Self-evidently, with both methods, fewer than ten "pictures" may be involved, e.g., seven different price-list sheets. In that event, for the example just given, only seven of the ten supply bins would be employed for the first technique, and only seven of the ten collecting stations would be employed for the second technique.

Having defined what is meant by "collating" and by "sorting", it is noted that the present invention relates to machines of the "sorter" type. In particular, the invention relates to problems of highly flexible and versatile sorting operation, and to the expense conventionally involved when large numbers of copies and sets are involved. For example, if 100 sets are to be formed, a conventional "sorter" would require 100 collecting stations or collecting bins.

SUMMARY OF THE INVENTION

On a very general level, it is an object of the invention to be able to sort in large-quantity situations, without requiring so many collecting bins. For example, in the case just mentioned (100 sets to be formed), the invention seeks to use not 100 collecting bins, but instead for example 10, or even as few as five. Likewise, for example, if each set to be formed consists of not 20 but instead 200 pictures, it is not to be required that the collecting bins be made correspondingly high, because by way of example during the sorting operation the stacks are deposited on a bin system. At the same time, for each combination of these extreme situations, the sorting operation is to be performed in essentially the same way. The reduction in the number of requisite collecting stations or bins is achieved by utilizing a plurality of successively performed sorting operations, making it possible to collect, in a single collecting station or bin, a plurality of successive sets, i.e., avoiding the need for a separate collecting station for each of the plurality of sets to be formed.

It is a concept of the invention that the feeding of cards be performed uninterruptedly even when the sorting machine is in the process of sorting, and likewise that the collecting stations or bins be capable of being emptied even while the sorting machine is in the process of sorting. This capability in conjunction with the inventive control technique to be described, makes it possible to use relatively inexpensive and quite compact equipment, no matter how many sets are to be formed and no matter how great the number of copies to be contained in each such set. The invention contemplates a sorting capacity and speed so high that a single sorting machine can receive and process copies being supplied from a plurality of other machines, e.g., copy machines.

The invention contemplates a sorting technique equally applicable to sheets and cards of all types, e.g., microfiches and film aperture cards as well as documents and the like. Of course, the sorting equipment must be constructed or adjusted to handle the material and dimensions involved. The simplest solution is available when the "pictures" are of standardized dimensions, as is the case for example with film aperture cards and microfiches. If a single sorting machine is to be capable of handling pictures of different dimensions, then use must be made of the conventional structural expedients utilized for such changeovers on ordinary sorting machine.

The invention is intended for the specific case where the collecting bins are to be fed the exact same number of copies from each CP-stack, and where the feeding of the pictures to the collecting bins occurs in the same sequence as is required for the sequence of the pictures within each single set to be formed.

Besides the sorting techniques referred to above, it is also known to control sorting machines in dependence upon sensed markings on the items being sorted, e.g., perforated card sorters, document-reading sorters, etc. In such systems, the determination of which collecting bin is to receive a particular card, or the like, results from the sensing of markings or other information on the card itself, for example by sensing the perforations in a perforated card or by reading visually and also mechanically readable information provided on such cards. These known sorting approaches are accordingly predicated upon the existence of "control markings" on the items to be sorted. When such control markings are sensed, it is of course quite easy to form the requisite sets using otherwise conventional sorting machines, because the pictures within each stack of identical pictures contain collecting-bin identifying information which is directly read by mechanical means.

In the case of microfilm aperture cards, this means that each copy produced carries not only a picture-identification number but also the current CP-number of a picture. If a hundred copies are to be made from picture A, then each of the hundred copies carries a respective one of the numbers from 001 to 100, in addition to code specifying that it is a copy made from picture A. On this basis, the conversion of the CP-groups to the desired sets can be performed rather directly. One needs only to feed in the individual picture stacks (CP-groups) one after the other into the sorting machine, and then sort on a columnwise basis in accordance with the CP-number. What is formed is a set of pictures A, B, C, etc., all having the same CP-number (CP-#1), and so on for the successive sets, the copies within the last set all having the CP-#100. It will be evident that the perforated coding-in of CP-numbers into microfilm aperture cards involves considerable expense, and it is questionable whether so complex a technique is warranted when the conversion of CP-stacks into sets is all that is actually involved.

The situation is not much better when microfiches are involved. The microfiche copies must be continually provided with the relevant CP-number by means of stripe markings or readable characters, which already presuppose that all the copying machines which feed to the sorting machine in question are capable of providing CP-numbers. Thus, in order to be able to perform the requisite sorting operations, one would have to depend upon manufacturers of microfiche-copying machines to provide their machines with means for filming the microfiche-CP-number onto the copies which are formed. Likewise, the sorting machine employed must be provided with optical readers, which can be quite costly, particularly for example if they are to be able to read alphabetic or written information.

Accordingly, it is a major object of the invention to be able to sort the CP-groups into sets, without first providing the cards (sheets, perforated cards, microfiches, documents, etc.) with CP-numbers, and thus without the need for mechanical readers capable of reading and interpreting such numbers. It is an object to be able to sort in complete independence of whether the producer of the copies provides them with auxiliary CP-number information, or not.

Of course, the inventive sorter does require control information for its operation, i.e., for routing cards to be different collecting bins. However, this sorting-control information, although in a sense triggered by the cards, is produced by the sorting machine itself, by counting the cards being processed and selecting the bin to which a card is to be routed in dependence upon the current count.

The inventive sorting technique and equipment fulfills the following task:

. to take M groups of sheets, each group consisting of N identical sheets, the sheets of each group being different from those of the other groups, and by means of distributive sorting, converting the M groups into N sets, the sequence of sheets within each set being the same as the sequence in which the M groups were fed for distributive sorting, the groupwise-fed sheets being distributed into a predetermined number of collecting bins, by means of a plurality of sorting operations performed at the sorting station, during each such sorting operation, the stacks of sheets formed in the individual bins during the preceding sorting operation being fed into the sorting station again, in the sequence in which the successive ones of the collecting bins are arranged, during these plural sorting operations, distributing the sheets into the bins without using coded markings on the sheets, but instead routing the sheets exclusively in dependence upon the counted cycles of operation of the sheet distributor and the number of collecting bins utilized, so that successively fed sheets are routed to successively located bins, whereby upon completion of the plural sorting operations each collecting bin contains a plurality of complete sets of sheets, with the number of sets thusly formed accordingly being greater than the number of collecting bins or stations utilized.

The inventive technique can, in certain situations, be implemented manually, but more generally by machine, and even utilizing otherwise standard sorting machines. The inventive technique involves new procedural steps for a sorting operation, and furthermore contemplates the provision of a sorting machine of unconventional operation, capable of operating both in conventional manner but also in the inventive manner, and in the latter case operating using only a small number of bins.

Before proceeding to the description of exemplary embodiments, it is believed appropriate to further define what is involved, by contrasting to it certain capabilities of conventional distributive sorting machines.

With conventional sorting machines, the groups of copies, which are fed to the distributor one after the other or even one atop the other, can each consist of an individual stack, or else the sheets can be fed to the distributor by an intermediate machine in the sequence in which they are removed, by such intermediate machine, from a respective stack.

For a simple case, it may be that 10 collecting stations are provided. The printer or copying machine first feeds 10 copies of picture A (i.e., A1, A2, . . . , A10) to the sorter, and the distributor of the latter distributes individual successive ones of these into individual successive ones of the 10 collecting stations. Then, 10 copies of picture B (B1 through B10) are likewise distributed one-by-one into individual respective ones of the 10 collecting stations. At the end of the sorting, each of the 10 bins contains a complete set of the pictures A, B, C, D, etc. For each of the groups (the A-group, the B-group, etc.) the distributor, in the performance of one operating cycle, distributes the ten pictures of that group into the ten collecting bins, and then the operating cycle of the distributor starts anew for the next such group.

It will be evident that, with such a distributing system, the number of collecting stations utilized must equal the number of sets to be formed. With known distributing systems, it is not permissible to feed into the system a succession of identical copies exceeding in number the number of available collecting stations. If the number of sets to be formed exceeds the number of collecting stations, the sorting job must be broken down into sub-jobs, e.g., taking only five copies from a CP-group and distributing them into five collecting bins, and so forth, until five sets have been formed, then forming another five such sets, and so forth, as in the following example:

| C 1 | C 2 | C 3 | C 4 | C 5 |
| B 1 | B 2 | B 3 | B 4 | B 5 |
| A 1 | A 2 | A 3 | A 4 | A 5 |

The number of letters (capital letters) in the above tabulation—i.e., the number of different pictures per set to be formed—can be increased as desired. However, if using a five-bin machine it is to be desired to form more than five sets, then it is necessary to repeat the sorting operation for the subsequent sets, e.g.,:

| C 6 | C 7 | C 8 | C 9 | C 10 |
| B 6 | B 7 | B 8 | B 9 | B 10 |
| A 6 | A 7 | A 8 | A 9 | A 10 |

Clearly, it is not possible to progressively distribute 10 copies of A into different successive bins; instead, one first distributes five copies of A, then five of B, then five of C—and then one returns to the sorting of more A-copies (A6 to A10). Otherwise, it is necessary to increase the number of collecting stations, to equal the desired number of complete sets.

Sorting machines are known having up to several hundred collecting stations. The collecting stations are nonmovable, and routing deflectors which are activated in synchronism with distributor operation deflect the sheets into the correct collecting stations; alternatively, the collecting stations are moved into register with the infeed unit of the sorter, one by one, and "distributive sorting" is achieved in this way.

Sorting machines are also known having the capability of selecting the number of collecting bins to be utilized. Selectors are provided to select the number of collecting bins to be involved in one cycle of operation of the distributor, i.e., if the number of sets to be formed is smaller than the number of collecting bins of the sorting machine.

Examples of known sorting machines of the kinds discussed above are disclosed in German Pat. No.

1,303,292; German published patent application No. 1,486,842; German published patent application No. 1,561,006; German published allowed patent application No. 2,048,981; and German published patent application No. 2,502,297.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view showing the appearance of a sorting machine utilized to form sets from groups of pictures in the manner in question;

FIG. 2 depicts the routing mechanism which routes one picture to one collecting bin;

FIG. 3 depicts the electromagnet activator for the routing mechanism;

FIG. 4 depicts another such sorting machine, but in section;

FIGS. 5, 6 and 7 depict details of the sorting machine of FIG. 4;

FIG. 9b is a pulse diagram referred to when explaining the operation of the circuit shown in FIG. 9a;

FIG. 10a depicts a modification of FIG. 8a, with pushbutton-activated selection of what is to constitute one operating cycle of the distributor of the sorting machine;

FIG. 10b is a tabulation of operating commands referred to in the explanation of the operation of the circuit shown in FIG. 10a;

FIGS. 13a, 13b and 13c are tabulations referred to in the explanation of how to determine the counts to be set on the preselectors of the machine, for a particular sorting job;

FIG. 14 is a schematic depiction of the preselectors;

FIG. 16/O is a tabular depiction of a series of successive groups of copies, each group consisting of five identical copies, the copies within each group being numbered in order from bottom to top;

FIG. 16/I depicts in tabular form what has happened to the copies depicted in FIG. 16/O after completion of the first sorting operation;

FIG. 17/O depicts in tabular form four groups (stacks), each group consisting of 25 identical copies, the copies being different in each group;

FIG. 17/I depicts in tabular form what has happened to the copies depicted in FIG. 17/O after completion of the first sorting operation;

FIG. 17/a depicts the sorting schedule for the cards arranged as shown in FIG. 17/I, to be followed during the second sorting operation;

FIG. 17/II depicts in tabular form what has happened to the cards depicted in FIG. 17/I after completion of the second sorting operation;

FIG. 18/O is a tubular depiction like FIG. 17/O, but showing four groups of pictures, each group consisting of 125 copies;

FIG. 18/I depicts what has happened to the copies of FIG. 18/O after completion of the first sorting operation;

FIG. 18/a depicts the sorting scheme to be applied to the copies arranged as in FIG. 18/I, to be followed during the second sorting operation;

FIGS. 18/IIa and 18/IIb together constitute a single tabular depiction (the top of FIG. 18/IIb following immediately upon the bottom of FIG. 18/IIa) showing what has happened to the cards arranged as in FIG. 18/I after completion of the second sorting operation;

FIG. 18/b indicates the sorting scheme to be applied to the copies organized as in FIGS. 18/IIa and 18/IIb, for performance of the third sorting operation;

FIG. 18/III illustrates, in tabular form, what has happened to the cards of FIGS. 18/IIa and 18/IIb after performance of the third sorting operation;

FIGS. 20/Ia and 20/Ib depict the result of the first sorting operation, for an odd number of copies such as 13; in both tabulations, the horizontal and vertical data are identical, but in FIG. 20/Ia the vertical columns are broken down into spaced sections, in order to make clearer the manner in which the desired sequence is developed; in FIG. 20/Ib there is no such diagrammatic break, but instead the spacing of data within each vertical column corresponds to the actual spatial locations of the individual copies in the collecting bins;

FIG. 20/II depicts the organization of the just mentioned cards after completion of the second sorting operation;

FIGS. 21/I, 21/II and 21/III respectively show what has happened to four groups of copies, each group containing an odd number of identical copies (here 113), after the first sorting operation, after the second sorting operation, and after the third sorting operation; the columnar groups of cards are broken up by diagrammatic spaces, to make clearer where new operating cycles commence, and additionally the starts of operating cycles are indicated by inclined arrows; of course, the stack of cards corresponding to each column in the tabulation is not spatially split in this way while in the respective bin but instead is a simple stack; and FIGS. 22a and 22b are tabulations of the formulas employed for determining the settings to which the preselectors of the machine are to be set, in general for any number of collecting bins of the machine.

DESCRIPTION OF THE PREFERRED EMBODIMENTS

Figure 8A:
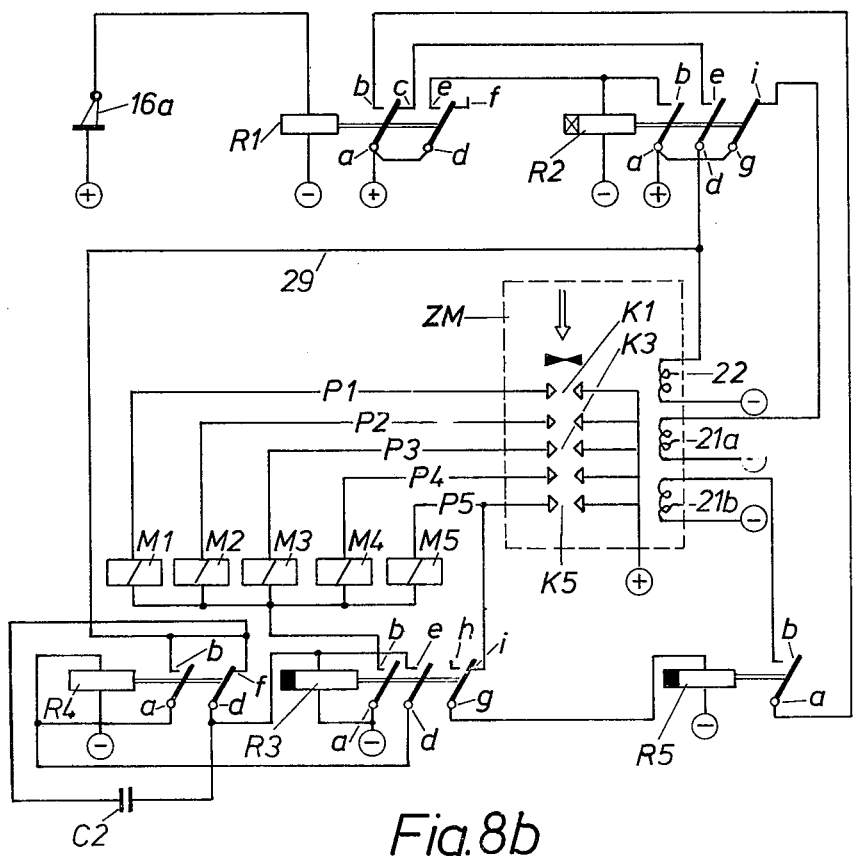
FIGS. 8a and 8b depict a circuit for energizing the control electromagnets of such a sorting machine.

In this description, the expression "bin" is used for the sake of concreteness, but it is to be understood that the expression bin is here to be understood to mean collecting station.

For the purpose of explanation, it will be assumed that one is dealing with a sorting machine for perforated cards, and that the machine has five bins. Other possibilities are discussed further below. Relative to conventional practice, the major departure, as repeatedly mentioned above, is that the sorting operations are not controlled in dependence upon coded or other such information on the cards, but by entirely other means.

The overall appearance of a sorting machine embodying the invention is depicted in FIG. 1, i.e., for the sorting of perforated cards.

The stacks of cards to be sorted can be continually laid into the infeed bin 10a. At the bottom of the stack of cards in bin 10a, a feed knife, either rotating or reciprocating, removes the bottom card, one after the next, and feeds the successive cards to the sorting mechanism. Although the sorting machine has six bins, only five of these can be controlled by automatic sorting, and the machine is for that reason referred to herein as a five-bin machine. The number of each of these bins is always presented herein in parentheses. The five operative bins are denoted (1), (2), (3), (4) and (5); (R) denotes a bin for remainders. It may happen, for various reasons, that the control of the sorting system malfunctions; in that case, the lack of a sixth bin (extreme left) might result in an accumulation of cards at the left side wall of the machine. This is prevented by provision of the remainder bin (R), into which such cards can be deposited.

With sorting machines of the type in question, sorting (defined earlier) can be performed in two different ways. In the first case, the routing system has plural branches, each leading into one bin, but the infeed zones of the routing branches are commonly located, and at this routing-system infeed location the card to be routed is guided into one or the other of the routing branches. In the second case, each bin is provided with a flap. Upon infeed of a card into the sorting machine, the card is sensed, and then travels along successive flaps; a time delay is introduced between the sensing of such card and the opening of one of the flaps, such that the flap associated with the bin which is to receive that card is opened at the time that the card in question actually reaches the bin, or more precisely the flap of the bin, into which it is to be routed. The first type of routing technique is disclosed, for example, in U.S. Pat. No. 2,708,514 and corresponding British Pat. No. 709,541; and in German Pat. No. 933,591 and corresponding British Pat. No. 750,284. The second type of routing technique, involving the time-delayed opening of bin flaps, is disclosed, for example, in German Pat. No. 424,516 and corresponding U.S. Pat. No. 1,656,999 and corresponding British Pat. No. 209,760; and in German Pat. No. 394,559 and corresponding U.S. Pat. No. 1,315,370 and corresponding British Pat. No. 128,207. In the case of the time-delayed flap-opening technique disclosed in this second group of patents, it is to be noted that nowadays, instead of the circuitry disclosed in those patents, use is more commonly made of electronic circuitry for the generation, storage and time-delayed transmission of the flap-opening command signals for the flap magnets of the routing system.

Although the control of relevant sorting mechanisms is disclosed in U.S. Pat. No. 2,708,514, the basics of that system will be briefly explained, with reference to FIGS. 2 and 3 of the present drawing.

The routing system includes five routing or sorting plates 11, arranged one above the other. The right ends of the routing plates (as viewed in FIG. 2) are staggered, so that each routing plate can be individually engaged at its right end by a respective pusher 12a. If one of these pushers is lifted by its associated sorter magnet 13a, this creates an infeed opening leading into the associated bin, for the card to be routed. The conventional adjustable sensing arrangement which senses the perforations in the cards and coordinates sensed information with bins, becomes superfluous in the present invention; as explained in detail below, the routing magnets are activated in a fixed sequence in synchronism with the cycle of operation of the distributor. To this end, there is provided a counter-activating sensor 16a; this sensor senses the edge of a card to be routed during infeed, and causes the count on a card counter to advance by one.

Using the other routing or sorting technique, i.e., involving time-delayed opening of bin flaps (depicted in FIGS. 4–7 of the present drawing), the sorting machine can have the same external appearance as in FIG. 1. The sorting flaps 12b and their distribution along the card transport path is depicted in FIG. 4. Successive adjoining cards located in the card transport path are spaced apart by gaps. The upwardly swingable sorting flaps 12b can enter into these gaps, in order to deflect the card upstream of such gap into the associated sorting bin. Typically, the sensing of the infeed of a card to be routed, and the generation of a flap-opening command signal, are performed at a single upstream location, and correlating means of one type or another delay the application of the flap-opening command signal to the control magnet associated with the flap to be opened, until the card in question actually reaches the flap to be opened; of course, the length of this time delay depends upon the flap to be opened.

As shown in FIGS. 4–6, the cards are pushed off the bottom of the stack in the infeed bin 10b, one by one, by means of a rotating feed knife 14, with gaps being left intermediate successive cards in the card transport path. Transport rollers effect the further transport of the individual cards, and when a card reaches the flap for the bin into which it is to be routed, this flap 12b opens, so that the card can enter into the correct bin. Immediately thereafter, the flap closes again, so that the next card, assuming it is not to enter that bin, can travel over the flap without entering the associated bin. Each sorting or routing flap 12b is mounted on a rotatable shaft 15 (FIG. 5). Each such shaft has an arm 18 located externally of the side wall of the machine. When the associated control magnet 13b is activated, the arm 18 is moved, and the associated flap 12b swings up, opening the respective bin.

Located intermediate the infeed bin 10b and the first sorting bin (5), there is provided (as in FIG. 3) a counter-activating sensor 16b, here a brush cooperating with a contact plate. This brush sweeps over the unperforated lateral edge of the card and transmits one input pulse to a card counter, for each card which passes it. The activation of the correct one of the sorting magnets occurs later, when the card reaches the corresponding sorting bin. This is implemented by a storage and control unit 19 (FIG. 7). When the latter receive a pulse at P1 the card sensed by brush 16a travels to bin (1) and at that time the flap for bin (1) opens; when unit 19 receives a pulse at P2, the sensed card travels to bin (2) and enters that bin; etc.

It will be clear that, for both types of sorting machine, the one of the five sorting bins which is activated depends upon which of inputs P1–P5 of unit 19 receives a pulse. The difference between the two types of sorting machine is merely that, for the first (FIGS. 2 and 3) the activation of the routing plates and the selection of the bin to receive a sensed card occurs very shortly after the card is sensed; whereas for the second (FIGS. 4–6) the opening of the correct sorting flap occurs after a time delay whose length depends upon which flap is involved.

These are the two major types of sorting action currently in use. The invention can be practiced using either type, as well as other equivalents. For the sake of explanation, the invention will be explained with specific regard to the sorting-machine type depicted in FIGS. 1–3, i.e., to the extent that it is necessary to specify at all which type of sorting action is involved. The specifics of the control of the routing plates, the holding circuits, the generation of start, stop and other such pulses during an operating cycle, and the like, are not disclosed in detail here, but reference may be had to the patent publications enumerated above for such details.

The cyclical and synchronized sorting of cards into bins will now be explained with respect to the arrangements described below. This explanation proceeds step by step, and is initially made with respect to the simplest and most simply operating embodiment, shown in FIGS. 8a and 8b. This embodiment utilizes electromagnetic means, but the electronic equivalents used in the later described embodiment of FIG. 9 can likewise be employed.

Figure 8B:
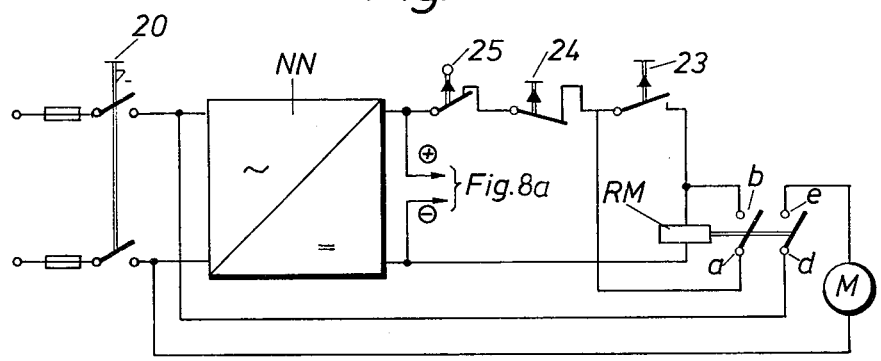

FIGS. 8a and 8b depict a relay circuit which utilizes a magnetic counter ZM as the step-by-step switching mechanism for the cyclical and synchronized sorting of cards into the five sorting bins. The magnetic counter ZM comprises a row of contacts. When magnetic counter ZM receives an input pulse, whichever contact is presently closed opens, and the next contact closes. Due to magnetic remanence, whichever switching state is most recently established persists indefinitely, i.e., until the next-following switching state is assumed, or until one or more resetting windings are energized to return the armature of the magnetic counter to its starting state. Of course, the counter is to be reset to its starting state manually or automatically when the sorting machine is first turned on.

RESETTING OF THE MAGNETIC COUNTER WHEN THE POWER SUPPLY IS SWITCHED ON.

The power supply and its associated controls is depicted in FIG. 8b, separate from the actual sorting-control circuitry of FIG. 8a. When the power-supply button 20 is pressed ON, the rectifier circuitry in power supply NN applies D.C. operating voltage to the relay circuitry of FIG. 8a; the rectified power-supply output voltage is applied to the circuitry of FIG. 8a, all the terminals marked + and − in FIG. 8a being connected, respectively, to the + and − power-supply output terminals in FIG. 8b. Firstly, via the normally closed contact g-i (FIG. 8a) of the delayed-pull-in relay R2 and the reset winding 21a, the magnetic counter ZM is caused to assume its starting state. The open NO-contact (normally open contact) d-e of relay R2 prevents the transmission of a counting pulse to the pull-in winding 22 of magnetic counter ZM until the opening of the NC-contact (normally closed contact) a-c of relay R1. As soon as the card-sensing brush 16a has energized relay R1, the delayed-pull-in relay R2 likewise becomes energized, via the NO-contact d-e of R1, and relay R2 is maintained connected to voltage via its NO-contact a-b, until the sorting machine is shut off. The connection between the card-sensing means and the pull-in winding 22 of magnetic counter ZM is readied by the closed NO-contact d-e of relay R2.

SYNCHRONIZED AND CYCLICAL ACTIVATION OF THE SORTER MAGNETS M1 TO M5.

Figures 13A, 13B, 14:
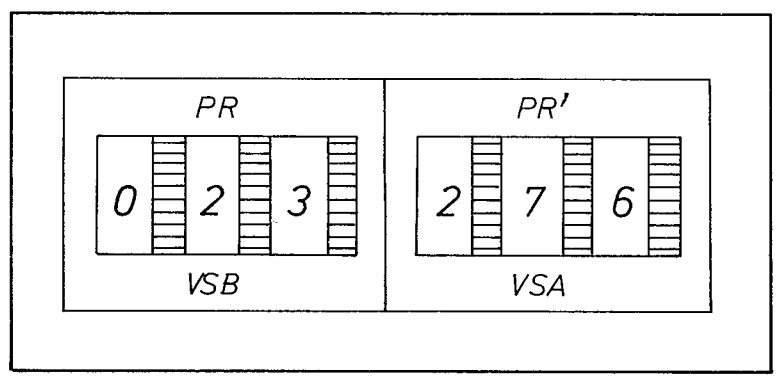

The five sorter magnets are denoted by M1 to M5, and correspond to the sorter magnets 13a of FIG. 3 and 13b of FIGS. 6 and 7. The first of these magnets to be energized is M1, and this occurs as follows. When the first card opens the brush contact 16a (FIG. 8a), current flow to the relay R1 is interrupted; R2 stays energized via its self-holding contact a-b and therefore contact d-e of R2 likewise stays closed. Via the NC-contact a-c of R1, the NO-contact d-e of R2 and the pull-in winding 22, the magnetic counter ZM accordingly receives its first counting pulse (input pulse). As a result, contact K1 becomes closed, and sorter magnet M1 becomes energized via line P1 and the NO-contact a-b of relay R3. Relay R3 was energized via the NC-contact a-c of R1, the NO-contact d-e of R2, line 29 and the NC-contact d-f of relay R4. M1 holds its routing plate up until such time as the first card has entered into the associated bin (1). The duration of the energization of each sorter magnet is determined by the delayed-dropout relay R3 as follows:

Relay R4 is energized via the NO-contact d-e of relay R3. Relay R4, due to the opening of its NC-contact d-f, interrupts the application of voltage to the winding of relay R3. In order to assure that relay R4 will reliably become energized during the transitional time interval—NC-contact d-f becomes opened and NO-contact a-b becomes closed—, a capacitor C2 is connected in parallel to the NC-contact d-f. Capacitor C2 briefly takes over the energization of R4 when contact d-f opens. (The same operation can be implemented if the NO-contact a-b of R4 is designed as an advanced-closing NO-contact.) Via the meanwhile closed NO-contact R4 a-b, the relay R4 stays connected to voltage, until the counting pulse in question terminates. The latter occurs when the brush contact 16a closes again. This occurs in the gap between two successive cards. Because the duration of the counting pulse (input pulse to the counter ZM) within the time interval corresponding to the sensing of corresponding edges of two successive cards, is longer than the pull-in time of the sorter magnets, the opened NC-contact R4 d-f prevents premature renewed energization of the delayed-dropout relay R3 and likewise therefor prevents improper energization of any of the sorter magnets.

As each successive card passes the brush contact 16a, it is a successive single one of the contacts of the counter which will be in closed condition. Thus, after the fifth card has been sensed by brush contact 16a, it is only contact K5 which is in closed condition. This fifth card is deposited into bin (5) because sorter magnet M5 is energized. Immediately after the trailing end of the fifth card moves past the brush contact 16a (the delayed-dropout relay R3 is at this moment already in its unactivated state), the resetting of the magnetic counter ZM is performed by a second reset winding 21b; i.e., the contacts K1 to K5 are then all in open condition again. This resetting of the magnetic counter ZM results from the following: The relay R1 becomes energized. Accordingly its contact a-c opens and R4 becomes unenergized and drops out. However, due to its magnetic remanence contact K5 stays closed. Via the closed contact K5 and the NC-contact R3 g-i, the delayed-dropout relay R5 becomes energized and therefore closes its NO-contact a-b. Because relay R1 is in energized condition, its NO-contact a-b and the NO-contact R5 a-b transmit a reset pulse to the second reset winding 21b of the magnetic counter and return the latter to its starting state. Thereupon, the synchronized and cyclical sorting of cards into the five bins can start anew; i.e., a new operating cycle can commence. The sixth card is deposited into bin (1), etc., and the tenth card into bin (5). The 31st card is routed to bin (1) and the 35th card into bin (5); the 36th card into bin (1); etc.

POWER SUPPLY AND MOTOR START/STOP.

This electrical functional block is separately illustrated in FIG. 8b. After the power-supply button 20 is pressed into its ON setting, the power supply immediately applies D.C. operating voltage to the relay circuitry of FIG. 8a. After pressing the start button 23 (FIG. 8b), motor relay RM becomes energized and, via its NO-contact a-b stays connected to voltage, until the stop button 24 or the microswitch 25 is activated. When motor relay RM becomes energized, its heavy-duty contact d-e connects the motor M to supply voltage.

As mentioned before, the sorting machine of FIG. 1 is provided with five sorting bins and one "remainder bin". The microswitch 25 of FIG. 8b is located in the remainder bin and is immediately activated if a card falls into the remainder bin. The remainder bin could also be called a monitoring bin, because as soon as a card is deposited into the remainder bin, this indicates the occurrence of a machine malfunction.

An electronic equivalent of the circuitry of FIGS. 8a and 8b is depicted in FIG. 9. The central functional unit of this control circuit comprises a 4-bit binary counter and a BCD-to-decimal decoder.

The input pulses counted by the 4-bit binary counter 30 are applied thereto each time that a card interrupts the beam path of an optoelectronic eye 31 comprised of a light source 31a and a light detector 31b. In a manner described below, the outputs of decoder 36, through the intermediary of AND-gates and power-amplifier stages, determine which sorter magnet is to be selected for activation. The length of the time interval for which the sorter magnets are energized is determined by a monostable circuit. After five input pulses have been counted, the 4-bit binary counter 30 has completed an operating cycle and is returned to its starting state.

POSITIVE RESETTING OF THE 4-BIT BINARY COUNTER 30 AND OF THE MONOSTABLE CIRCUIT 37 WHEN THE SUPPLY VOLTAGE IS SWITCHED ON.

It is presumed that no card is present between the light source 31a and light detector 31b of the optoelectronic eye 31, because otherwise after the positive resetting has been effected the first input pulse for the counter would be immediately generated. When the machine is first set into operation, this prerequisite is anyway met as a practical matter, and is therefore mentioned only for the sake of completeness. After pressing the power-supply button 20 (FIG. 8b) so that it assumes its ON-setting (FIG. 8b is the power-supply circuit for FIG. 9a as well as for FIG. 8a), the power supply applies D.C. operating voltage to the electronic control circuitry of FIG. 9a. A differentiator 34 produces at its output QE a single switch-on pulse, i.e., in response to power-supply switch-on and at no other time. This switch-on pulse is transmitted via an OR-gate 35 to the reset inputs RR of the 4-bit counter and of the monostable circuitry 37.

The duration of the switch-on pulse generated by differentiator 34 is so selected that the duration $t_a$ of the reset pulse is longer than the response time of the phototransistor 31b of the optoelectronic eye 31. This assures that the functional blocks in question are positively and reliably reset to their starting states. In its starting state, the 4-bit counter 30 carries L-signals on its outputs QA-QD, whereas the outputs P1-P5 of BCD-to-decimal decoder 36 and output Q of monostable circuit 37 carry H-signals. The AND-condition is fulfilled for none of the AND-gates AG1-AG5 connected to the outputs of decoder 36 and monostable stage 37. Accordingly, the power-amplifier stages L1-L5 and the sorter magnets M1-M5 remain unenergized.

ACTIVATION OF THE SORTER MAGNETS M1-M5, BEGINNING WITH M1.

So long as phototransistor 31b receives light, its output Q furnishes an L-signal. The Schmitt trigger 32 connected thereto is non-inverting, so that its output Q likewise carries an L-signal. The latter is applied to input A of an inverter 38. Inverter output Q accordingly furnishes an H-signal. The H-signal applied to the counting input T of counter 30 does not produce counting, because counter 30 responds only to H-to-L transitions.

Because the AND-condition for AND-gate 39 is not met, its output Q is unaffected (L-signal at input A and H-signal at input B). No further function is triggered. Now, if the leading edge of the first card interrupts the light path of the optoelectronic eye 31, the signal at output Q of 31b changes from L to H. Accordingly, the output signal of Schmitt trigger 32 changes from L to H. The signal at output Q of inverter 38 therefore changes from H to L. This H-to-L transition causes the counter 30 to advance to its first count. The signal at output P1 of decoder 36 now changes from H to L. The L-signal at output P1 persists, until the second card causes counter 30 to advance to its second count. The output signals at outputs P2 to P5 of decoder 36 progress analogously.

The H-to-L transition at output Q of inverter 38 just mentioned simultaneously serves (via a differentiator 40) to trigger monostable circuit 37 at its input A to its unstable state. The signal at output Q of monostable circuit 37 accordingly changes from H to L. This L-signal is applied to all A inputs of the AND-gates AG1 to AG5. However, only AND-gate AG1 is activated, because only here is the AND-condition (L signals at both the A and B inputs) met.

The power-amplifier stage L is activated and accordingly the associated sorter magnet M1 energized. After elapse of the unstable-state interval $t_a$, the monostable circuit 37 returns to its stable state. Its output Q again furnishes an H-signal. The AND-condition at the inputs A and B of AND-gate AG1 is no longer met, and accordingly sorter magnet M1 ceases to be energized.

As soon as the first card has left the optoelectronic eye, the signal at output Q of light detector 31b changes from H to L. No further function is initiated. The next-following, second card interrupts the light path of the optoelectronic eye and the signal at output Q of detector 31b changes from L to H. Simultaneously, the signal at output Q of inverter 38 changes from H to L. The H-to-L transition has the result, that via the input T of the counter the counter is caused to assume its second counting state. The decoder output P1 changes from L to H and its output P2 from H to L. Simultaneously, as described above, the monostable circuit 37 goes into its unstable state and its output Q again furnishes an L-signal. Because now the AND-condition is only met for AND-gate AG2, power-amplifier stage L2 energizes sorter magnet M2 and, after elapse of the unstable-state time interval, magnet M2 becomes unenergized again. For the subsequent cards, the third, fourth and fifth cards, these operations relating to energization and deenergization of sorter magnets are repeated, analogously.

CYCLICAL RESETTING OF THE 4-BIT BINARY COUNTER

In order that the sorter magnets M1, M2, etc., be energized in sequence, and repeatedly, the 4-bit binary counter 30 is reset to its starting state as soon as the trailing end of the fifth card has left the optoelectronic eye. After the counting of the fifth card, the decoder output P5 and accordingly the input B of AND-gate 39 carry an L-signal. When the fifth card leaves the optoelectronic eye, the output Q of light detector 31b and of the Schmitt trigger 32 and also the input A of AND-gate 39 carry an L-signal. Accordingly, the AND-condition is met at the inputs A and B of AND-gate 39. Output Q of AND-gate 39 then likewise furnishes an L-signal and resets the binary counter via the OR-gate 35.

From the pulse diagram of FIG. 9b, it can be seen that at the decoder outputs the time for P5 is shorter than the times for P1 to P4. This shorter pulse duration has no effect upon proper operation, because previous to the L-to-H transition at P5 the associated sorter magnet has already been deenergized.

PULSE DIAGRAM

The pulse diagram of FIG. 9b applies to the sorting of five cards, whose corresponding time intervals are denoted by C1, C2, C3, C4, C5 beginning with bin (1), etc. In diagram section QE, there are depicted four pulse lines illustrating the positive assumption of the starting state resulting from the switch-on pulse QE1. The arrow U indicates the moment at which the power supply is switched ON. QA to QD depict the signal conditions at the outputs QA to QD of the 4-bit binary counter 30. P1 to P5 depict the same for the outputs of decoder 36, and Q 37 for the output Q of monostable circuit 37.

The diagram sector SOR relates to sorting operation per se. Q32 depicts the output Q of Schmitt trigger 32, Q38 the output Q of inverter 38, P1-P5 the outputs of decoder 36, and M1-M5 the energization states of the sorter magnets. Between the P and M lines, line A37 depicts the signals at input A of monostable circuit 37, and line Q37 at the output Q of 37.

The bottom diagram sector RST depicts at line Q 39 the output signal of AND-gate 39, and, in parentheses, the signals at outputs P1-P5 of decoder 36 for the resetting operation.

ESTABLISHING THE RULES

The above described simple systems of FIGS. 8a, 8b and 9a, 9b suffice for performing the inventive method for the following cases:

Five copies are to be made from each one of any number of different pictures. In one single card runthrough, five identical sets can be assembled, each consisting of the same number of differing pictures. This case is described in greater detail later on, in connection with FIGS. 16/O and 16/I.

25 copies are made from each one of any number of different pictures. The resultant copies, in two card runthroughs can be formed into 25 (5×5) identical sets, each consisting of the same number of differing pictures. This case is described in greater detail below, in connection with FIGS. 17/O, 17/I and 17/II.

125 copies are produced from each one of any number of different pictures. In three card runthroughs, 125 (5×5×5) identical sets can be formed, each consisting of the same number of differing pictures. This case is explained in greater detail in connection with FIGS. 18/O to 18/III.

The whole procedure can be considerably simplified by using so-called separating cards (denoted by SP in FIG. 16 and subsequent Figures). These have the same format as the cards to be sorted, but differ therefrom with respect to one or another characteristic, such as color, so that they can be readily distinguished. During the sorting process, these separating cards are handled as though they were additional copies. The separating cards serve to facilitate separation of individual complete sets from one another. After the entire sorting process is complete, the SP-cards can be removed and used again for another sorting job.

For all these particular jobs, it suffices, in the case of the electrochemical embodiment of FIGS. 8a and 8b, to have the reset winding 21b controlled via relay R5 from the left side of K5 and, in the case of the equivalent electronic embodiment, to effect the production of the reset pulse (input B of AND-gate 39) using decoder output P5.

Evidently, the same means here utilized for five bins could likewise be utilized for 10 bins. It would merely be necessary to provide the counter with ten counting states. The number of bins can even be unspecified. In that event, for each case, the rules which become applicable are those illustrated in the following explanatory examples:

| With 5 Bins: | | |
|---|---|---|
| in one sorting operation | | 5 sets |
| in two sorting operations 5 × 5 | | 25 sets |
| in three sorting operations 5 × 5 × 5 | = | 125 sets |
| With 8 Bins: | | |
| in one sorting operation | | 8 sets |
| in two sorting operations 8 × 8 | | 64 sets |
| in three sorting operations 8 × 8 × 8 | = | 512 sets |
| With 10 Bins: | | |
| in one sorting operation | | 10 sets |
| in two sorting operations 10 × 10 | | 100 sets |
| in three sorting operations 10 × 10 × 10 | = | 1000 sets |

These rules result from the fact that the counting of the cards and their sorting into the bins must over and over again start anew from the beginning, i.e., the counting from count one and the sorting from bin (1). Accordingly, the number of bins utilized and the base number of the sets to be formed must be identical.

If this rule is valid, then for 3 copies per set 3 bins would actually suffice, even if 5 bins are available. Further below, it will be explained why this is actually the case. In the same connection, it will also be shown that, by counting off the copies using special counting devices, any desired number of sets whatsoever can be assembled using a machine with a limited number of bins (e.g., five).

EXPANSION OF THE CAPABILITIES OF A 5-BIN MACHINE

FIG. 10a depicts an expansion of the circuit of FIG. 8a. The addition resides in the fact that any one of the outputs P1 to P5 can be selected in advance for generation of the reset pulse for the counter. Branching off output lines P1 to P5 are lines containing push-to-close/push-to-open self-locking pushbutton switches T1 to T5 whose contacts K11 to K15 can be selectively connected to the reset winding 21b of the electromagnetic counter.

Using the pushbutton switches T1 to T5, one can change from the permanent connection between reset winding 21b and line P5 to a selectable connection between the reset winding and any one of lines P1 to P5. For example, if pushbutton switch T3 is closed, the magnetic counter ZM will be reset to starting state with the time delay associated with relay R5, when contact K3 of the counter becomes closed. The sorter magnets M4 and M5 and the associated sorter bins will be skipped over during every cycle of operation.

FIG. 10b depicts the individual pushbutton switches T1 to T5 and, above those, a tabulation consisting of vertical columns. The items in each vertical column signify what operations require that the pushbutton switch as the bottom of that column be activated. The pushbutton switches T1 to T5 are interlocked switches; i.e., only one can be closed at any given time, so that only the operations in a single one of the vertical columns can be performed at any given time. What horizontal line of this tabulation (i.e., the operations in a horizontal line of the table) is involved, depends upon the number of copies per original (indicated at the right of the table by CP).

Figure 19:
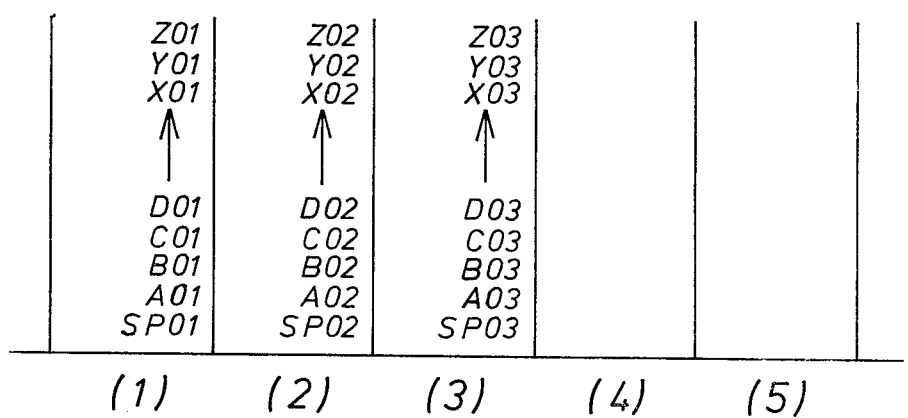
FIG. 19 depicts in tabular form the result of the inventive sorting technique, when applied to sets consisting of an odd number of copies, such as three copies per set.

For up to 5 CP, the top horizontal line of the tabulation is involved. I/5 signifies the following: A single (first and only) sorting operation with 5 CP; Pushbutton switch T5 to be used. The machine operates with a 5-card operating cycle. If there are only 4 CP per original (I/4), then pushbutton switch T4 is used, and the machine operates with a 4-card operating cycle. The same applies, analogously, for 3 CP, i.e., I/3 and switch T3. The sorting of 3 CP per original (and Z originals) is depicted, in tabular form, in FIG. 19. If there is made from each original only a single copy and if, as is here presupposed for operativeness, each copy is fed to the sorting machine in the correct sequence, then there is evidently no need for the sorting machine at all. Nevertheless, for the sake of completeness at this point, and for reasons which will become understandable further below, a pushbutton switch T1 with a contact K11 is shown under the first column in FIG. 10b. If, in the situation just mentioned, one anyway wishes to feed the copies through the sorting machine (i.e., even though there is only one copy per original and these are already in the correct order), pushbutton switch T1 is activated, and the machine operates on a one-card operating cycle; i.e., the successively recived copies are fed one after the other into a single collecting bin.

The next possibility to consider in this: That there be, per original, up to 25 CP. For the sake of simplicity, let it be initially assumed that the number of copies made from each original is either 25, 20, 15 or 10, i.e., a multiple of 5. Irrespective of which of these multiples is involved, the switch T5 is closed for the Ist (first) sorting operation (in accordance with FIG. 10b). The machine then performs a 5-card operating cycle; i.e., absolutely all the cards including all the separating cards are distributed into all five bins (cf. FIG. 17/I). For the second (II) sorting operation, the pushbutton switch to be used depends upon whether 10 or 15 or 20 or 25 CP are involved. Of course, for only 5 CP, a second sorting operation is not even required, because the problem degenerates to the simple one-sorting-operation case already described.

For 10 or 15 or 20 or 25 copies per original, one uses one of pushbutton switches T2, T3, T4, T5. Depending upon the number of CP, only the first two, or only the first three, etc., bins are filled. FIG. 17/a schematically indicates the sequence in which the cards for the second sorting operation are to be fed into the sorting machine. For example, II/(1)-1 signifies this: for the second sorting operation, the cards deposited into bin (1) as a result of the first sorting operation are to form the bottom of the new stack to be laid into the infeed bin of the sorting machine. This must be made clear: FIG. 17/a is a tabular depiction of a single stack of 100 cards (25 copies of A, 25 copies of B, 25 copies of C, and 25 separating cards SP), i.e., all the cards shown in FIG. 17/I. This single stack is formed after the first sorting operation as follows: First, take the stack of cards in bin (1), and put these into the infeed bin of the sorting machine. On top of those, place the cards from bin (2); on top of those the cards from bin (3); on top of those the cards from bin (4); and on the very top the cards from bin (5). I.e., it is in this sense, that the tabulation in FIG. 17/a represents the actual physical stack which is to be laid into the infeed bin of the sorting machine, for performance of the second (II) sorting operation. (At this point, the reader may have already observed that, in FIG. 17/I, i.e., just after the first sorting operation has been completed, the stack in bin (1) is nominally identical to the stack in bin (2), and so forth. Accordingly, it is to be noted that the tabular representation of FIG. 17/a takes into account, first, the possibility that the copies may have been provided (by the copying machine) with serial numbers, or the like, in which case a serial arrangement of the finished sets may be desirable; also, the tabulation in FIG. 17/a is put forth for purposes of generality, i.e., for purpose of similarity of other procedures in more complex situations described further below.)

FIG. 17/II depicts in tabular form the contents of the five bins (1) to (5) after completion of the second sorting operation. It will be seen that the stack in bin (1) consists, at its bottom, of a substack consisting of separating card SP01, copy A01, copy B01, copy C01; and above the latter, a substack consisting of separating card SP02, copy A02, copy B02, copy C02; and so forth. I.e., the sorting job is entirely completed.

Next, we discuss cases where three sorting operations are necessary, because from each original up to 125 CP have been produced. It will be assumed, in particular, that exactly 125 copies have been produced. FIG. 18/O depicts, in tabular form, the stacks to be laid into the infeed bin of the sorting machine. There are four such stacks: a stack of 125 separating cards SP001-SP125; a stack of 125 copies of original A; a stack of 125 copies of original B; and a stack of 125 copies of original C; these latter three stacks having been received from the copying machine.

For the first sorting operation (see I/125 in FIG. 10b), pushbutton switch T5 is activated. Accordingly, during the first sorting operation, all 500 cards (the 375 copies and the 125 separating cards) are distributed into all five bins, the machine operating with a 5-card operating cycle. FIG. 18/I depicts in tabular form the contents of bin (1), of bin (2), etc., after completion of this first (I) sorting operation.

Next, comes the second (II) sorting operation. As indicated in FIG. 10b (II/125), here again switch T5 is closed. For the second (II) sorting operation, the stacks in the five bins are removed therefrom and laid, one atop the other, in the infeed bin of the sorting machine, in the order tabulated in FIG. 18/a, i.e., the stack from bin (1) at the bottom of the infeed bin, the stack from bin (5) at the top of the infeed bin. During the second (II) sorting operation, the sorting machine again runs with a 5-speed operating cycle. FIGS. 18/IIa and 18/IIb (constituting a single tabulation), show the contents of bin (1), of bin (2), etc., after completion of the second (II) sorting operation. It will be readily apparent that the desired sets have not yet actually been formed.

Accordingly, a third (III) sorting operation must be performed. Depending upon whether the number of CP involves (up to 125) is 50 or 75 or 100 or 125, one closes for the third (III) sorting operation the respective one of switches T2, T3, T4 or T5, as tabulated in FIG. 10b. (As already mentioned, one is assuming in FIG. 18 that 125 copies of each original are involved, and accordingly one will close switch T5). For the third (III) sorting operation, there can be no need to use switch T1, as indicated in FIG. 10b; i.e., the horizontal line (bottom line) in FIG. 10b shows what is needed for a third (III) sorting operation and the inclusion of III/25 in the T1-column would not make sense. Besides, for 25 CP there is no need for a third sorting operation, because in such event only two sorting operations are needed (field II/25 in FIG. 10b, corresponding to depression of pushbutton switch T5).

Anyway, having completed the second (II) sorting operation, the stacks from the five bins are removed therefrom and combined to form the stack tabulated in FIG. 18/b; the stack which is formed in bin (1) as a result of the second sorting operation is placed at the bottom of the infeed bin for the third sorting operation; the stack which is formed in bin (5) as a result of the second sorting operation is at the top of the infeed bin for the third sorting operation. FIG. 18/III depicts the contents of bin (1), of bin (2), etc., after completion of the third (III) sorting operation. It will be clear that the desired finished sets have now been formed.

In the foregoing (simple) examples, it has been assumed that one is dealing in integral multiples. I.e., when describing the case where up to 25 CP of each original have been formed, it was assumed that the actual number of CP was a multiple of 5; when describing the case where up to 125 copies of each original were formed, it was assumed that the actual number of CP was a multiple of 25.

Clearly, in actual practice, such a simplifying assumption is untenable. A sorting machine must be capable of producing any number of sets, the minimum number of sets being 2 (i.e., 2 CP made from each original), the maximum number of sets depending upon the capability of the machine, e.g., 125 sets in the case of a machine having 5 bins and capable of performing three successive sorting operations ($5^3 = 125$). Thus, for example, in real life, it may be necessary to utilize three sorting operations for the forming of 3 sets, or 13 sets or 113 sets; i.e., there may be 3 copies of each original involved, or 13 copies of each original involved; or 113 copies of each original involved; etc.

FIG. 13 depicts a control circuit which, in additional to what has already been described, can implement the following:

(a) discontinue a 5-card operating cycle in the middle thereof and begin a new one starting at bin (1), each time that a preselected number of cards has been sorted, i.e., as determined by a card counter; and (b) automatically reduce the just-mentioned preselected number by subtracting from it the number one (unity), each time a further preselected number of cards has been counted, this further preselected number being freely selectable.

The operation of this control circuit, and how the two numbers in question are preselected, will now be explained with respect to a few specific examples, for the sake of concreteness.

The following job is assumed: 13 copies were made from each one of an original A, an original B, and an original C. These copies plus 13 separating cards SP (which can be considered 13 copies of each one of four originals) are to be formed into 13 sets. The performance of this job is depicted, in the tabular form already explained, in FIGS. 20/Ia to 20/II.

One begins by performing the first (I) sorting operation. All five collecting bins are utilized for the first sorting operation. However, each time that 13 cards have been sorted (i.e., the number of CP per original), a new 5-card operating cycle is immediately started for the next-following card; i.e., the next-following card is sorted into bin (1). As a result, and as evident from FIG. 20/Ia, at the end of the first (I) sorting operation, bins (1) to (3) will contain more cards than bins (4) and (5). This is the first operating condition defined at (a) just above.

The contents of bin (1), of bin (2), etc. after the first (I) sorting operation is finished, is tabulated in FIGS. 20/Ia and 20/Ib. The reader is reminded that these two FIGURES contain identical lists of information, but that the columns in FIG. 20/Ia are split up, to make clear the individual operating cycles, and in particular the discontinuing of a 5-card operating cycle in the middle thereof and the starting of a new 5-card operating cycle, after each 13th card has been sorted.

Next, the second (II) sorting operation is to be performed. As before, to form the infeed stack for the second sorting operation, one takes the cards from bin (1) and places them at the bottom of the infeed bin, the cards from bin (2) on top of those, the cards from bin (3) on top of the cards from bin (2), and so on, with the cards from bin (5) at the very top of the infeed stack in the infeed bin.

FIG. 20/II (as all such tabulations herein) depicts the contents of each bin after completion of the second sorting operation, but also, it depicts the sequence in which the cards have been sorted. In this second sorting operation, after each third card, a new operating cycle is initiated, i.e., starting again at bin (1); in the electromagnetic control circuit, it is accordingly required that pushbutton switch T3 be closed. Thus, only three collecting bins are actually utilized. After each 36th ($3 \times 12$) card, the number of bins utilized is decreased by one; in this specific example, after the 36th card, only bins (1) and (2) continue to be utilized. This is the operation defined at (b) just above. The number of cards which one sorts previous to reducing the number of bins by one, is equal to the number of cards per set to be formed, multiplied by the number of complete and incomplete quintets of sets, multiplied by the number of sets contained in the incomplete quintet of sets. In the case of 13 CP of 4 originals (SP, A, B, C), these numbers are:

| | |
|---|---|
| number of originals | 4 |
| number of complete and incomplete quintets of sets (here, there are 2 complete groups of five sets each, plus an incomplete quintet) | 3 |
| number of sets in the incomplete quintet (the group of sets constituting an incomplete quintet here consists of three sets) | 3 |

Accordingly, the reduction by one of the number of cards which are sorted previous to the immediate start of a new operating cycle occurs after the 36th card ($4 \times 3 \times 3 = 36$), as can be seen in FIG. 20/II.

If there were 7 originals, the 22 CP of each original, then this number would be $7 \times 5 \times 2 = 70$. Thus, the reduction by one of the number of bins utilized (from 5 bins to 4 bins) would occur after the 70th card.

Finally, we consider a CP number above 25, e.g., 113 CP, requiring no fewer than three sorting operations.

For the first (I) sorting operation, one requires 5 bins (FIG. 21/I). The 5-card operating cycle is discontinued in the middle thereof and a new operating cycle commenced, after 113 cards have been sorted.

For the second (II) sorting operation, one again makes use of all five bins. This time, the 5-card operating cycle is discontinued in the middle thereof and a new operating cycle commenced, each time the number of cards which have passed into bins equals the number of groups of five in the CP-number. In the case of 113 CP, equal to 22 complete groups of five plus one remainder group (a total of 23 complete or incomplete groups of five), the starting of a new operating cycle at bin (1) occurs after 23 cards have been sorted. The reduction by one of this number (i.e., down to 22) occurs, when the number of series of 23 cards each actually sorted equals the product of the number of originals and the CP number of the incomplete group of five. For 113 CP, there are 3 CP in the remainder group. In the case of, for example, 4 originals, the reduction by one must be performed after 12 groups-of-23, i.e., after 276 cards have been sorted (FIG. 21/II).

For the third (and last) sorting operation, the number of bins to be utilized must be selected again. This selection can be defined exactly as was done with respect to the second sorting operation, except that, instead of the quintets (groups-of-5) use is made of groups-of-25. For 113 CP, this makes for four complete groups-of-25 and a remainder group consisting of 13 CP, i.e., a total of 5 complete and incomplete groups-of-25. Accordingly, it is necessary to utilize all five bins. The drop-down to 4 bins occur when 13 (number of CP in the remainder group) times 4 (number of originals) = 52 groups of five operating cycles each have been performed, i.e., when 260 cards have been sorted (FIG. 21/III). All subsequent cards (in the case of 113 CP and 4 originals, the 192 subsequent cards) are sorted to 4 bins.

The circuitry which can be used to implement this programmable control will be described with respect to FIGS. 11 and 12.

PROGRAMMABLE ELECTROMAGNETIC CONTROL (FIG. 11)

In a manner analogous to FIGS. 8a and 10a, when the power supply is switched on the magnetic counter ZM is brought into its starting state, via the NC-contact R2 g-i of the delayed-pull-in relay R2 and the reset winding 21a. Analogous thereto, in FIG. 11 the electronic forward-counting counters PR and PR' are likewise reset, via the NC-contact R2-g-i and their reset inputs R and R'. The diode D1 assures that, upon the automatic resetting of forwards-counting counter PR, the forwards counter PR' will not become reset, when the count of the former has reached the predetermined number N or Z.

Figure 11:
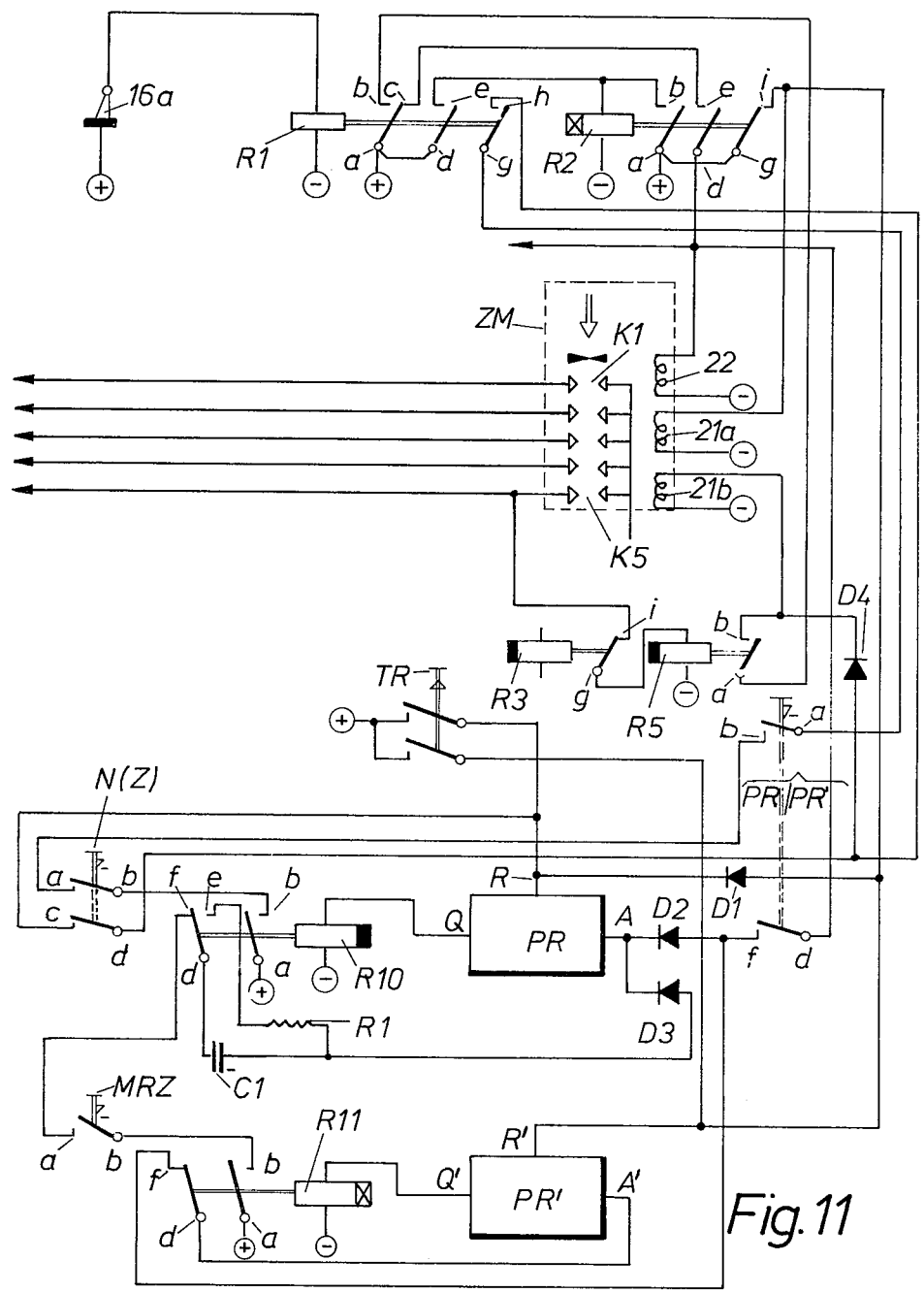
FIG. 11 depicts an electromagnetic program control for free selection of the number of sets to be formed.

So long as the pushbutton switch PR/PR' is open, the circuit of FIG. 11 operates in the same way as that of FIG. 10a. The resetting of magnetic counter ZM and accordingly the start of a new operating cycle at bin (1) always occur after bin (5) has received a card (contact K5). When the card corresponding to the highest-numbered bin utilized for the operating cycles has been deposited into this bin, the delayed-dropout relay R3 becomes deenergized and therefore closes its NC-contact R3 g-i. As a result, the delayed-dropout relay R5 becomes energized and closes its NO-contact a-b. Via the likewise closed NO-contact R1 a-b, the NO-contact R5 a-b and the reset winding 21b, the magnetic counter ZM is reset to its starting state.

The pushbutton switches T1 to T5 are no longer required, in this circuit, because their functions are taken over by the unit PR, described below.

Each of the two blocks PR and PR' depicted in FIG. 11 comprises a forwards counter and a selector switch for selecting any desired multi-digit number. When the forwards counter has reached the selected number, a signal is produced at output Q and Q', causing relay R10 or R11 to become energized. The counters in blocks PR and PR' can be reset by application of reset pulses to their reset inputs R and R'.

The operation of this control circuit will be described with respect to the concrete example tabulated in FIGS. 21/I to 21/III (113 sets, each set containing 4 cards).

First (I) sorting operation:

Because the number of sets N exceeds 5, each new operating cycle beginning at bin (1) starts after a card has been deposited into bin (5). This commencement of a new operating cycle occurs (for the illustrated settings in FIG. 11) as already described with respect to FIG. 8a, if the pushbutton switch PR/PR' is not closed or the number selected for block PR is greater than 5. A further requirement for the sorting operation is that after each 113th card the operating cycle be discontinued and a new operating cycle begin again with bin (1). This latter requirement is met by setting the selector switch of block PR to the number 113. Additionally, the switch PR/PR' and the switch N(Z) are to be closed.

Up to the 110th card, the machine operates with 5-card operating cycles. Thereafter, the 111th, 112th and 113th cards are respectively sorted in to bins (1), (2) and (3). After bin (3) has received the 113th card, the count of the forwards counter in block PR will be 113, so that at the output Q of PR a signal is generated, and relay R10 is energized. Via the NO-contact R10 a-b, contact a-b of the closed pushbutton switch N(Z), the contact a-b of the closed pushbutton switch PR/PR', the NO-contact R1 g-h and diode D4, the reset winding 21b, in the manner already described earlier, resets the magnetic counter ZM. Accordingly, after bin (3) receives a card, a new operating cycle commences at bin (1). Simultaneously, the forwards counter of PR is reset to zero via the pushbutton-switch contact N(Z) c-d. As operation continues, block PR produces at its output Q a signal after each 113th card and the resetting operations just described are performed each such time.

Second (II) sorting operation:

As in the first (I) sorting operation, for the second (II) sorting operation the sorting machine operates with a 5-bin operating cycle. An additional requirement, for the second sorting operation, is that until after the 276th card is dropped into a bin, a new operating cycle be started at bin (1) after each 23rd card. After the 276th card has been dropped into a bin, the situation is altered: from then on, a new operating cycle is started at bin (1) after each 22nd card. The reason for this drop-down from every 23rd card to every 22nd card, has already been explained above.

By closing pushbutton switch TR, the entire control circuit of FIG. 11 is reset to its starting state. The selector switch of unit PR is set to the number 23. The pushbutton switch N(Z) is kept closed. The selector switch of unit PR' is set to the number 276. The pushbutton switch MRZ is also kept closed. The pushbutton switch PR/PR' likewise stays closed. Up to and including the 20th card, the sorting machines operates with a simple 5-bin operating cycle. Thereafter, the 21st 22nd and 23rd card are respectively fed into bins (1), (2) and (3). After that, the count on the counter of PR is 23, and an output signal appears at output Q energizing relay R10. As with the already described first sorting operating, the reset winding 21b is caused to reset the magnetic counter ZM. Thus, after bin (3) receives the 23rd card, a new operating cycle is commenced at bin (1). Simultaneously, the forwards counter of PR is reset and, until the 276th card has been sorted, a new operating cycle beginning at bin (1) is commenced after every 23rd card.

After the sorting of 12×23=276 cards, the counter of block PR is at count 23, and the counter of block PR at count 276. The delayed-dropout relay R10 pulls in without delay, whereas the relay R11 is a delayed-pull-in relay; accordingly, first relay R10 becomes energized and then relay R11. First, relay R10 (as already described) resets magnetic counter ZM and simultaneously resets the forward counter of unit PR. After energization of relay R11, the counting input line A' of block PR' is interrupted by the opening of NC-contact R11 d-f. Via the NO-contact R11 a-b of pushbutton switch MRZ (contact a-b) positive potential is first applied to contact R10f. As soon as the delayed-dropout relay R10 closes its NC-contact R10 d-f, capacitor C1 (serving as a differentiator) transmits a positive counting pulse to the counting input line A of unit PR, so that the latter will already have changed by one during the time corresponding to the gap between two successive cards. Until the next reaching of the count 23, 22 input pulses (generated by the card sensor) must be received. Accordingly, already after the counting of the next 22 cards, a "restart the operating cycle" pulse is transmitted to the magnetic counter ZM. Due to the energization of relay R10, the capacitor is discharged by means of the contact R10 d-e and resistor R1. Diodes D2 and D3 at the counting input line A of unit PR prevent backflow signal effects that could interfere with the operation of other control-circuit components.

The third (III) sorting operation:

In order that the counters be reset, the pushbutton switch TR is closed. All remaining pushbutton switches remain in the settings which they had for the second (II) sorting operation. Up to and including the 260th card, the sorting machine operates with a simple 5-bin operating cycle, and for the 261th card and thereafter with a simple 4-bin operating cycle. The selector switch of PR is to be set to the number 5, and that of PR' to the number 260. Until after the sorting of the 260th card, the preselection of the number 5 causes simple 5-bin-operating-cycle operation. After sorting of the 260th card, when relay R10 drops out (as already explained with regard to the second sorting operation) an input pulse is already counted by the counter of unit PR, so that for subsequent operation the sorting machine operates with a 4-bin operating cycle.

PROGRAMMABLE ELECTRONIC CONTROL CIRCUIT (FIG. 12)

Figure 9A:
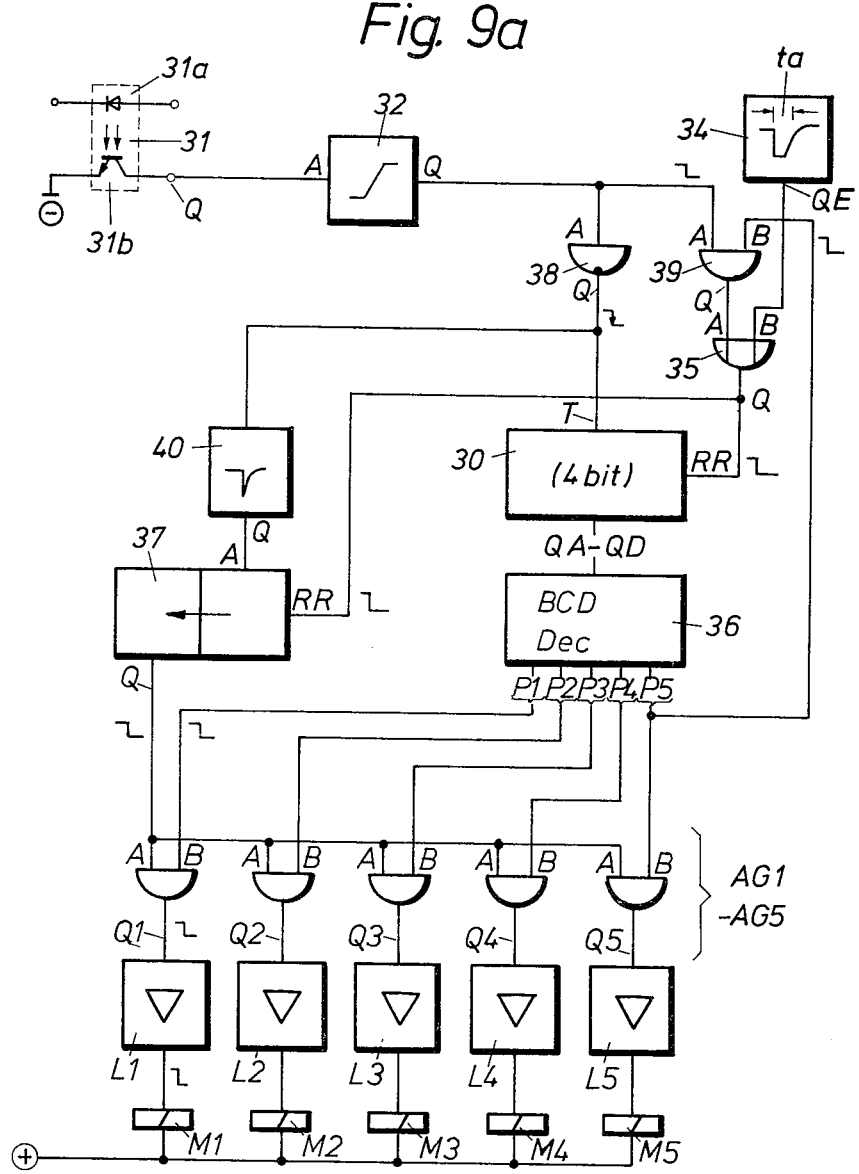
FIG. 9a depicts an electronic control circuit equivalent to that shown in FIGS. 8a and 8b.
Figure 12:
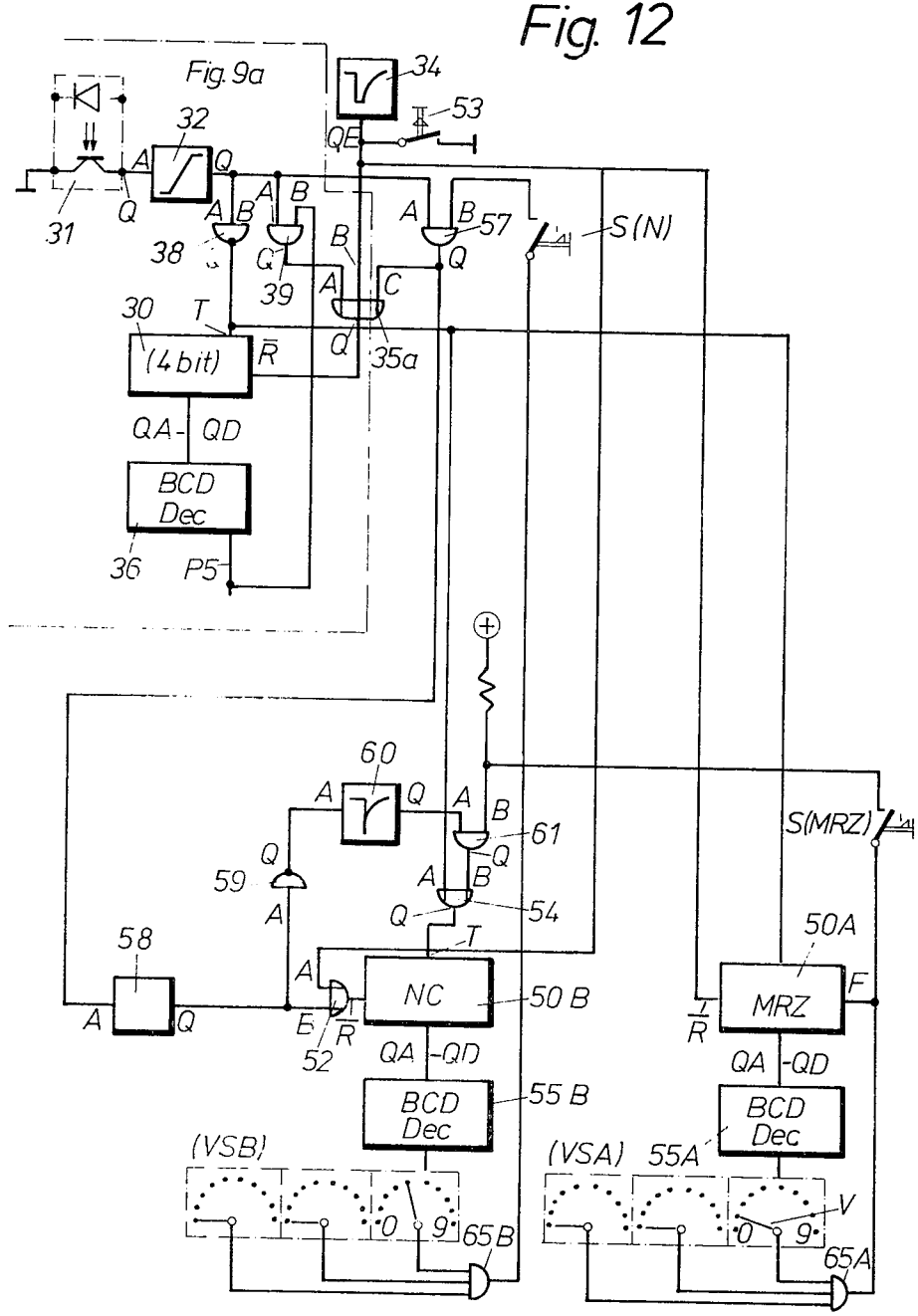
FIG. 12 depicts the electronic equivalent of the program control shown in FIG. 11.

The control circuit of FIG. 12 includes the complete "base circuit" of FIG. 9a. The OR-gate 35 is merely changed from a two-input gate to a three-input gate, and is here denoted by 35a. The input C, in conjunction with special counting blocks, makes possible the auxiliary recommencement of an operating cycle at bin (1).

The additional circuitry comprises two counter groups 50A/55A and 50B/55B. In FIG. 12, there is illustrated for each counter group only one decade (the units-digit place of a multi-digit number). It is self-evident that decades can be provided in greater number as desired, e.g., tens, hundreds, and so forth. The outputs of the individual decades of each counter group are to be connected to respective selector switches VSA, VSB via respective AND-gates 65A and 65B. Each decade of the two counter groups comprises a 4-bit binary counter 50A or 50B and, connected to the output thereof, a BCD-to-decimal decoder 55A or 55B. The decoder outputs 0 to 9 are connected to the respective selector switches VSA or VSB. As will be evident from FIG. 12, a signal will be produced at the output of the selector switch of a decade only if the setting of the selector switch corresponds to the count on the respective counter 50A or 50B.

Positive resetting of all counters upon power-supply switch-on and resetting upon change of program:

When the power supply is switched on, the differentiator 34 produces at its output QE a reset pulse. Via the input B of OR-gate 35a and the reset input $\bar{R}$ of counter 30, the latter is set to its starting state. Analogously, the counter 50B is set to its starting state via the input A of OR-gate 52 and its reset input $\bar{R}$. The resetting of counter 50A (MRZ) is performed by means of a direct connection to its reset input $\bar{R}$. Upon a change of program, pushbutton switch 53 ("erase") is pressed, in order to return all counters to their starting states in the manner described above.

Operations performed in the counter group 50B for the first sorting operation:

The selector switch 50B (NC) for counter group 50B is set to the number N of sets to be assembled and the switch S(N) is closed. Selector switch 50A (i.e., the selector switch of 50A) is brought to its zero setting. When the leading edge of the first card interrupts the light path of the optoelectric eye, the output Q of eye 31 changes from L to H. Then the output Q of Schmitt trigger 32 changes from L to H. The inverter 38 undergoes signal change at its output Q from H to L. As a result of tis H-to-L transition, via the input A of OR-gate 54 and the counting input T, counter 50B (NC) counts the first card. The first output of the decoder 55B changes potential from H to L. Parallel to counter 50B, the card in question is also counted by counter 30, and a simple 5-bin operating cycle is followed by the sorting machine.

If the number of copies per original counted in counter 50B corresponds to the setting of its associated selector switch VSB, an L-signal appears at the output of AND-gate 65B. Via the switch S(N) this L-signal is firstly applied to input B of AND-gate 57. As soon as the last-counted card has left the optoelectronic eye 31, input A of AND-gate 57 likewise carries an L-signal and the AND-condition is fulfilled. The L-signal is transmitted via input C or OR-gate 35a to the reset input R̄ of counter 30 and returns the latter to its starting state. The next-following operating cycle commences at bin (1).

Upon meeting the AND-condition at AND-gate 57, the L-signal is also transmitted to the input A of monostable circuit 58. As a result, the latter assumes its unstable state and, for the duration of the latter, produces an L-signal at its output Q. Via the input B of OR-gate 52 and the reset input R̄ of counter 50B (NC), the latter is returned to its starting state. Via the inverter 59, differentiator 60 and AND-gate 61, no further functions are initiated, because at input B no L-signal is present and therefore the AND-condition is not met.

Functions performed in the counter group 50A (MRZ):

The selector switch VSA for the counter group MRZ is to be set to the previously computed number. The selector switch VSB is to be brought into its zero setting. The counting input T of the counter 50A is connected to the output Q of inverter 38, so that each card which passes through the optoelectronic eye is counted. After reaching the preselected number, there is produced at the selector switch VSA an L-signal which is transmitted to the enablement input F of the counter 50A (MRZ). As a result, the counting of further cards is blocked. Via the switch S (MRZ), the L-signal furnished at selector switch VSA is constantly applied to input B of AND-gate 61.

Cooperation of the counter groups 50A (MRZ) and 50B (NC) for the second sorting operation, as well as for all further sorting operations, in accordance with the program prerequisites:

For "unround" numbers of sets, it is necessary, for the second sorting operation and for all further sorting operations, to decrease by one from the card which initiates the start of a new operating cycle at bin (1). At the start of the second sorting operation, the start of a new operating cycle occurs when the count in counter NC reaches the number N to which selector switch VSB is set. The counter MRZ determines after what number of copies the immediate start of a new operating cycle is to be made to occur one card earlier. This reduction by one of the number of cards after which a new operating cycle is to be immediately begun, is implemented by the fact that after the resetting of counter NC the latter immediately counts one input pulse. This occurs intermediate the counting of two successive cards in the following manner:

As described just above ("Functions performed in the counter group 50A (MRZ)), each reaching the count to which the selector switch VSA has been set, input B of AND-gate 61 is enabled. After reaching the number for which selector switch VSB is set (previous to the reduction to n-1), after the meeting of the AND-condition at AND-gate 57, the monostable circuit 58 is caused to undergo a change of state by an L-signal at its input A: Via the input B of OR-gate 52 and the reset input R̄, the counter NC is reset. After elapse of its unstable-state duration, the output Q of monostable circuit 58 changes from L to H. The H-signal is inverted by inverter 59 and applied as an L-signal to input A of differentiator 60.

The output Q of the latter transmits a brief L-signal to input A of AND-gate 61. The latter's input B already carries an L-signal, so that the AND-condition is met. Via the input B of OR-gate 54 and the counting input T, the count in counter NC is advanced by one, right away, i.e., not in response to an actual card. The next-following first card when counted by counter NC results in a count of two, etc. After the counting of n-1 input signals, the counter NC has already reached the count N for which the selector switch VSB has been set. Because counting action on the part of counter MRZ is blocked at its enablement input F, so that this counter constantly applies an L-signal to input B of AND-gate 57, this immediate counting of one input pulse (i.e., not in response to an actual card) occurs for all further resettings of the counter NC.

PROGRAM INSTRUCTIONS

FIGS. 13a to 13c indicate the program instructions which are to be followed for a compiling operation.

As always CP denotes the number of copies per original (or equivalently, the number of complete sets to be formed). B indicates the number of copies (including a separating card, if used) per set.

The Roman numerals I, II and III respectively refer to the first, the second and the third sorting operations. After each sorting operation, preliminary to the performance of the next sorting operation, the contents of the bins of the sorting machine must be removed and formed into a new stack to be laid into the infeed bin of the sorting machine, as repeatedly explained above.

PR/VSB or PR'/VSA are the counts to which the corresponding selector switches (FIG. 11 or 12) are to be set.

FIG. 13a specifies the program for two, three, four or five sets (requiring only one sorting operation), FIG. 13b for six to twenty-five sets (requiring two sorting operations), and FIG. 13c for twenty-six to 125 sets (requiring three sorting operations).

For 2 to 5 sets, as shown in FIG. 13a, the selector switch of PR or VSB are to be set to a number equal to the number of CP per set. The switch MRZ stays open.

For 6 to 25 sets, as shown in FIG. 13b, for the first (I) sorting operation the selector switch of PR or VSB is to be set to the number of CP per set. The switch MRZ is not closed.

For 6 to 10 copies per set, for the second (II) sorting operation, the selector switch of PR or VSB is to be set to the number 2, for 11 to 15 copies to the number 3, and so forth. The number to be set on the selector switch of PR' (in the electromagnetic control circuit) or an VSA (in the electronic control circuit) is equal to the number B of cards to be contained in each set, multiplied by the number to which PR or VSB has been set (see the line above in the same column of the table), multiplied by the difference between CP and the number indicated in the respective column at the bottom line of FIG. 13b. A concrete example: The second sorting operation is in question, and therefore one consults the bottom three horizontal lines of the tabulation in FIG. 13b (marked II, for second sorting operation). Assume the number of sets to be formed is 13 (CP=13); assume that the number of cards per set (including the separating card, if used) is 4. Then the number to which the selector switch of PR' or VSA is to be set is $4 \times 3 \times (13-10)$ equal sign 36. For the second sorting operation, switch MRZ is to be closed.

As already explained, for 25 to 125 sets, three sorting operations are needed. As can be seen from FIG. 13c, for the first (I) sorting operation, the number to which PR or VSB is set equals the number of copies (CP). For the second (II) sorting operation, the setting for PR or VSB are taken from the relevant column of FIG. 13c (i.e., depending whether CP is in the range 26-30, or 31-35 or 36-40, etc.). The same column is also used for determining the number to set on PR' or VSA. FIG. 13c likewise tabulates, using the same scheme, the settings to be established for the third (III) sorting operation. For the second and third sorting operations, the switch MRZ is to be closed.

The determination of the numbers to be set will be explained still again, for the sake of concreteness, and for the specific case of 113 sets and 4 cards per set. For the first (I) sorting operation, the selector switch PR or VSB is set to the number 113. For the second (II) sorting operation, the selector switch PR or VSB is set to the number 23, corresponding to the CP-column "111 to 115". The number to be set on selector switch PR' or VSA is the product of the number of copies per set (4 cards per set), times the number set on selector switch PR or VSB (here 23), times the difference 113−110 (i.e., 3). Thus:

$$4 \times 23 \times 3 = 276.$$

For the third (III) sorting operation, the number to be set on PR or VSB is 5. The number to be set on PR' or VSA is $$4 \times 5 \times (113 - 100) = 260.$$

FIG. 14, finally, depicts the external appearance of such a program selection switch arrangement, i.e., able to implement the foregoing. The selector switch of PR or the selector switch VSB is located on the left, the selector switch of PR' or the selector switch VSA on the right. If the number of sets is 113, then for the second (II) sorting operation PR (or VSB) is preset to 23, and PR' (or VSA) is set to 276, as shown in FIG. 14. The manner in which these preselections were derived has already been explained.

For the sake of orderliness, it is here stated once more that when deriving the numbers to which the selector switches are set, the separating cards are considered to be copies, i.e., because the sorting machine will not distinguish between true copies and blank separating cards. The separating cards preferably differ in color from the other cards (true copies), and facilitate separation of individual sets, after all sorting has been completed.

As already demonstrated above, the formation of sets can be performed with machines having any arbitrary number of sorting bins, the minimum number of sorting bins, however, being 2. In general, the greater the number of sorting bins utilized, the fewer sorting operations will be needed, for a given number of sets to be formed. However, the ranges in question partly overlap, because the number of sorting operations required increases stepwise. For example, for 11 to 25 CP two sorting operations are required irrespective of whether the sorting machine has 5 bins or 10 bins; likewise for 101 to 125 CP three sorting operations are required irrespective of whether the sorting machine has 5 bins or 10 bins.

FIGS. 22a and 22b are tabulations giving the formulas to be used for determining the numbers to be set on the selector switches for each one of the first, second, third and fourth (I, II, III and IV) sorting operations, for any possible number of bins:

F = the number of available sorting bins of the machine (not counting the remainder bin)

M = the number of copies (including the separating card SP, if used) to be contained in each complete set N = the number of sets to be formed Z = the number to be set on the selector switch of PR or the selector switch VSB $\overline{Z}$ = the number to be set on the selector switch of PR' or the selector switch VSA I, II, III, IV = the first, second, third, and fourth sorting operations, respectively.

It must be pointed out that in the Z columns in FIG. 22b the indicated divisions, when they do not yield an integer, are to be rounded off to the next-higher integer, to yield the actual number Z. The thusly determined number Z is then used in the adjoining $\overline{Z}$ columns.

As can be seen from FIGS. 22a and 22b, in all ranges of numbers of sets, the same computational formula is utilized for the same sorting operation. Additionally, for different sorting operations (e.g., the IInd and IIIrd) the computational formulas differ in the power of F utilized. Because of the regularity of these formulas, they can be readily expanded, if this should be needed, for still greater numbers of sets and accordingly a greater number of sorting operations.

To make sure that the reader fully understands the use of the tabulations in FIGS. 22a and 22b, this will be explained, again with respect to the concrete example of 113 sets and 4 cards per set, using 5 sorting bins:

Ist sorting operation: $Z = N$; $\overline{Z} = O$.

N = 113; immediate restart of operating cycle at bin (1) after 113 cards.

IInd sorting operation: $Z = N/F$;
$\overline{Z} = M \cdot Z \cdot [N - F \cdot (Z-1)]$ $Z = 113/5 = 22$ remainder 3, rounded off to $Z = 23$ $\overline{Z} = 4 \cdot 23 \cdot [113 - 5 \cdot (23-1)] = 4 \cdot 23 \cdot (113-110) = 276$ IIIrd sorting operation: $Z = N/F^2$;
$\overline{Z} = M \cdot Z \cdot [N - F^2 \cdot (Z-1)]$ $Z = 113/25 = 4$ remainder 13, rounded off to $Z = 5$ $\overline{Z} = 4 \cdot 5[113 - 25 \cdot (5-1)] = 4 \cdot 5(113-100) = 260$ As will be clear, use of the tabulations in FIGS. 22a and 22b has yielded the same settings for the selector switches as already described earlier.

ALTERNATIVE SELECTABILITY OF SET-FORMING OPERATIONS USING MARKINGS ON THE COPIES

In the preferred embodiment of the invention, the capability described above is retained, i.e., no need for routing markings on the copies to be sorted, but added thereto is the capability of sorting copies which do happen to be provided with routing markings. This will be the case, for example, for microfilm aperture cards. If these are perforation-coded with the number of the corresponding original, then the coded copies can be sorted on the basis of this coded information. Thus, if any cards are out of correct sequence when deposited into the sorting bins this can be corrected, or if any cards are out of correct sequence in the infeed stack, sorting operation can be modified to correct this sorting. In such a case, the control system of the sorting machine will operate in dependence upon a monitoring unit which senses and interprets the coded markings on the cards.

The control system of the sorting machine can have a basic operation such as described at length above, with the coded markings on the copies being mechanically read and interpreted only for the purpose of monitoring operation and for initially corrective action at such times as the need for corrective action arises.

However, as another alternative, it would also be possible to switch between the control action of the present invention and a conventional control action which is dependent exclusively upon the sensing of the coded markings on the copies. Such a machine can be constructed as shown in FIGS. 1–3 and, when its operation is controlled exclusively in dependence upon such coded markings, it can operate as disclosed in U.S. Pat. No. 2,708,514. The selectability of alternative modes of operation can be implemented using the circuit schematically depicted in FIG. 15 of the present description. The lower part of FIG. 15 corresponds to the circuit in FIG. 19 of U.S. Pat. No. 2,708,514, and the upper part of FIG. 15 corresponds to the lower half of FIG. 9a of the present description.

Figure 15:
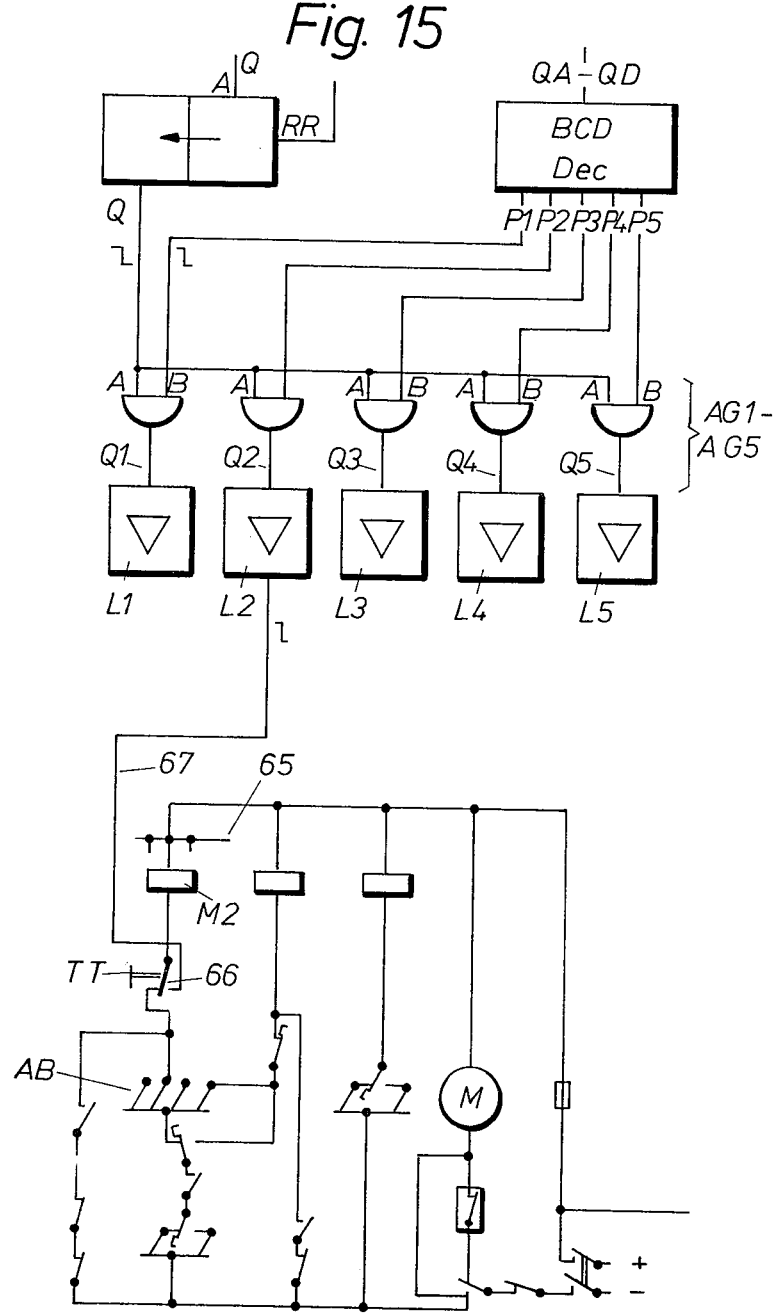
FIG. 15 depicts a control circuit capable of preselection of the number of sets to be formed in the manner of the present invention, and alternatively capable of sorting in dependence upon routing information carried on the items to be sorted.

The five sorter magnets M1 to M5 (FIG. 9a) are in FIG. 15 connected in parallel off a line 65. Each magnet is selectably connectable to an associated amplifier L (L1 to L5) or to a perforation sensor AB. In FIG. 15, the pushbutton switch TT is in a setting connecting magnet M2 to the perforation sensor, so that sorting operation can be controlled on the basis of the sensed perforations in the cards to be sorted. If the pushbutton switch TT is pressed to assume its other setting, the sorter magnet M2 becomes connected to amplifier L2 via contact 66 and line 67. When the magnets are thusly connected, the sorting machine operates in the inventive manner. It is to be understood that the pushbutton switch TT controls switch contacts 66 for all magnets M, these contacts 66 operating in unison.

In the exemplary control systems described herein, in order to avoid even further complexity in explanation, use is made of selector switches which must be set to certain numbers before starting the first, the second and the third sorting operations, etc. Furthermore, the numbers to which these selector switches are to be set is, for the exemplary control circuits disclosed, not self-evident and must be determined from one of the disclosed tabulations, e.g., FIGS. 22a and 22b. It is emphasized that this procedure, i.e., requiring the operator to consult a reference tabulation and/or perform a computation in order to know what numbers to set on the selector switches, is disclosed for the sake of simplicity. Although, in actual practice, it does not place a particularly great burden on the operator, it should be understood that the need to refer to tabulations or perform computations can be avoided. For example, circuitry can be provided including two selector switches, on one of which the operator merely sets the number of complete sets to be formed, on the other of which the operator merely sets the number of cards which will be contained in each such set, i.e., quite directly without any reference to tabulations or the need for even simple computation. Elementary computing circuitry can then set the selector switches disclosed above to the properly calculated settings. Calculating circuitry of this type, although nowadays quite inexpensive, will not even be absolutely necessary. For example, use could instead be made of a read-only memory (ROM) storing the correct selector-switch settings for all possible combinations of set number and CP number.

Likewise, in the embodiments described above, it is assumed that at the end of each sorting operation, the operator removes the cards from the bins, to form a new infeed stack which he then places in the infeed bin for the next sorting operation. It should be self-evident that this formation of the new infeed stack is quite elementary and simple, and could be performed mechanically, i.e., by automatic means, if that were actually thought necessary.

It will be understood that each of the elements described above, or two or more together, may also find a useful application in other types of circuits and constructions differing from the types described above.

While the invention has been illustrated and described as embodied in a sorting machine whose mechanical sorting mechanism is of one of several described types, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of sorting sheets comprising the steps of feeding to an infeed station successive ones of M groups of sheets, each group consisting of N identical sheets, the sheets within each group differing from those of the others of the groups; and converting these M×N sheets into N sets, each set containing M sheets, each sheet within a set coming from a different respective one of the M groups, the sequence of sheets within each set corresponding to the sequence in which the M groups were fed to the infeed station, this conversion comprising:

performing a first sorting operation, independently of routing information, if any, provided on the sheets, by depositing successive ones of the sheets of the successive groups of sheets onto successive ones of a limited number of collecting stations in a cyclical manner utilizing cyclically operating counting means to control performance of the first sorting operation, the number of collecting stations utilized being smaller than the number N of sets to be formed, until all M×N sheets have been deposited onto collecting stations, then performing at least one further sorting operation, likewise independently of routing information, if any, provided on the sheets, each further sorting operation comprising first taking the slacks accumulated at the collecting stations out of the collecting stations and feeding them back in into the infeed station in the order in which successive collecting stations received sheets during the preceding sorting operation, and then performing another such sorting operation, again utilizing cyclically operating counting means to control performance of the sorting operation, until all M×N sheets have again been deposited onto collecting stations.

2. The method defined in claim 1, using a sorting machine having an infeed station, a limited plurality of collecting stations, and distributing means for cyclically distributing sheets into successive ones of all the collecting stations, using this distributing means to perform the first sorting operation utilizing all collecting stations and the at least one further sorting operation utilizing all collecting stations.

3. The method defined in claim 1, using a sorting machine having an infeed station, a limited number of collecting stations, selecting means for selecting the number of successive collecting stations to be utilized for sorting, and distributing means operative for cyclically distributing sheets into successive ones of the preselected number of collecting stations, and during said at least one further sorting operation changing the number of successive collecting stations to which the distributing means cyclically distributes sheets.

4. In a sorting machine of the type operative for receiving successive ones of M groups of sheets, each group consisting of N identical sheets, the sheets within each group differing from those of the others of the groups, the sorting machine having an infeed station and a plurality of collecting stations, and means for distributing successive ones of the received sheets into successive ones of the collecting stations in a cyclical fashion in order to perform a sorting operation, an improvement comprising the provision of control means operative for causing the distributing means to repeatedly perform operating cycles involving a predetermined number of the collecting stations, and means operative after the sorting of a first predetermined number of sheets for causing the discontinuance of an operating cycle prior to completion thereof and the initiation of anew operating cycle.

5. In a sorting machine as defined in claim 4, further including means operative after the sorting of a second predetermined number of sheets for automatically changing the first predetermined number.

6. In a sorting machine of the type operative for receiving successive ones of M groups of sheets, each group consisting of N identical sheets, the sheets within each group differing from those of the others of the groups, the sorting machine having an infeed station and a plurality of collecting stations, and means for distributing successive ones of the received sheets into successive ones of the collecting stations in a cyclical fashion in order to perform a sorting operation, an improvement comprising the provision of control means capable of properly controlling the cycles of operation of the operation of the distributing means when the number N of sets to be formed exceeds but is an integral multiple of the number of collecting stations utilized for sorting, the control means including user-operated selecting means for selecting the number of collecting stations to be utilized in the performance of an operating cycle of the distributing means; and adjacent to the user-operated selecting means a guidance panel bearing a tabulation of characters indicating various numbers of sets to be formed, also indicating the number of sorting operations to which for such set-numbers the M groups of N sheets must be subjected, and furthermore indicating for the various combinations of set-number and number of sorting operations the setting to which the user should set the user-operated selecting means for each such sorting operation.

* * * * *